(12) United States Patent
Nakajo et al.

(10) Patent No.: US 9,167,658 B2
(45) Date of Patent: Oct. 20, 2015

(54) LIGHT EMITTING ELEMENT LIGHTING DEVICE AND LIGHTING FIXTURE USING SAME

(71) Applicant: Panasonic Corporation, Osaka (JP)

(72) Inventors: Akira Nakajo, Kyoto (JP); Hiroshi Kido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 202 days.

(21) Appl. No.: 13/933,283

(22) Filed: Jul. 2, 2013

(65) Prior Publication Data

US 2014/0015443 A1 Jan. 16, 2014

(30) Foreign Application Priority Data

Jul. 12, 2012 (JP) .................................. 2012-156656

(51) Int. Cl.
*H05B 33/08* (2006.01)
*H02H 9/00* (2006.01)

(52) U.S. Cl.
CPC ........... *H05B 33/0896* (2013.01); *H02H 9/001* (2013.01); *H05B 33/089* (2013.01); *H05B 33/0845* (2013.01)

(58) Field of Classification Search
CPC .... H05B 37/00; H05B 37/02; H05B 33/0818; H05B 33/0851
USPC ............................ 315/224–226, 291, 307–308
See application file for complete search history.

(56) References Cited

U.S. PATENT DOCUMENTS

| 7,646,989 | B2 | 1/2010 | Kato | |
|---|---|---|---|---|
| 2006/0279228 | A1 | 12/2006 | Kato | |
| 2007/0223164 | A1 | 9/2007 | Oki et al. | |
| 2010/0176745 | A1* | 7/2010 | Keh et al. | 315/294 |
| 2010/0277095 | A1* | 11/2010 | Loef et al. | 315/294 |
| 2011/0291576 | A1* | 12/2011 | Wong et al. | 315/210 |

FOREIGN PATENT DOCUMENTS

| JP | 61025336 A | 2/1986 |
|---|---|---|
| JP | 63-207657 A | 8/1988 |
| JP | 2004-129419 A | 4/2004 |
| JP | 2006-339298 A | 12/2006 |
| JP | 2007-265805 A | 10/2007 |
| JP | 2007-265806 A | 10/2007 |

OTHER PUBLICATIONS

Extended European Search Report for corresponding European Application No. 13173682.9 dated Nov. 6, 2013.

* cited by examiner

*Primary Examiner* — John Poos
(74) *Attorney, Agent, or Firm* — Renner, Otto, Boisselle & Sklar, LLP

(57) ABSTRACT

The light emitting element lighting device in accordance with the present invention, includes: a light emitting unit including a light emitting element; and a power supply circuit configured to supply a supply voltage to the light emitting unit. The power supply circuit is configured to increase the supply voltage from a first voltage lower than a lighting start voltage of the light emitting element to a second voltage higher than the lighting start voltage to light up the light emitting unit. The power supply circuit is configured to, in a process of increasing the supply voltage from the first voltage to the second voltage, decrease a rate of increase in the supply voltage as the supply voltage gets closer to the second voltage.

12 Claims, 15 Drawing Sheets

(a)

(b)

LIGHT EMITTING ELEMENT LIGHTING DEVICE AND LIGHTING FIXTURE USING SAME

TECHNICAL FIELD

The present invention relates to light emitting element lighting devices and lighting fixtures using the same.

BACKGROUND ART

Recently, development of an organic EL element which is a thin solid light emitting element has been promoted. For example, a lighting device employing such an organic EL element as its light source has been proposed (e.g., see document 1 [JP 2007-265805 A]).

The lighting device disclosed in document 1 includes a light emitting unit constituted by organic EL elements, and a DC power source configured to supply a desired DC voltage to the light emitting unit. However, the organic EL element has a capacitance component. Therefore, there is a problem that application of a voltage to the organic EL element is likely to cause an excess rush current to flow into the organic EL element.

In consideration of this problem, in the lighting device disclosed in document 1, an inductor which serves as a current limiting device is interposed between the DC power source and the organic EL element to decrease the rush current which flows through the organic EL element when a voltage is applied.

In the aforementioned prior lighting device, suppression of the rush current flowing through the organic EL element is achieved by the inductor connected between the DC power source and the organic EL element. However, connection of the inductor is likely to cause a distortion in a current waveform and an increase in a loss.

SUMMARY OF INVENTION

In view of the above insufficiency, the present invention has aimed to propose a light emitting element lighting device which can decrease a rush current flowing into the light emitting element while suppressing a distortion in a waveform of a current flowing through the light emitting element as well as an increase in a loss, and a lighting fixture using the same.

The light emitting element lighting device of the first aspect in accordance with the present invention, includes: a light emitting unit including a light emitting element; and a power supply circuit configured to supply a supply voltage to the light emitting unit. The power supply circuit is configured to increase the supply voltage from a first voltage lower than a lighting start voltage of the light emitting element to a second voltage higher than the lighting start voltage to light up the light emitting unit. The power supply circuit is configured to, in a process of increasing the supply voltage from the first voltage to the second voltage, decrease a rate of increase in the supply voltage as the supply voltage gets closer to the second voltage.

With regard to the light emitting element lighting device of the second aspect in accordance with the present invention, in the first aspect, the power supply circuit is configured to increase the supply voltage in accordance with a change curve defining the rate of increase in the supply voltage.

With regard to the light emitting element lighting device of the third aspect in accordance with the present invention, in the first or second aspect, the power supply circuit is configured to increase the supply voltage from the first voltage to the second voltage after charging of a capacitance component of the light emitting element is completed.

With regard to the light emitting element lighting device of the fourth aspect in accordance with the present invention, in any one of the first to third aspects, the power supply circuit is configured to increase the supply voltage from zero to the first voltage gradually.

With regard to the light emitting element lighting device of the fifth aspect in accordance with the present invention, in the fourth aspect, a voltage increase rate of the supply voltage from the first voltage to the second voltage is greater than the voltage increase rate of the supply voltage from zero to the first voltage.

With regard to the light emitting element lighting device of the sixth aspect in accordance with the present invention, in any one of the first to fifth aspects, the power supply circuit is configured to decrease the first voltage when decreasing the second voltage.

With regard to the light emitting element lighting device of the seventh aspect in accordance with the present invention, in any one of the first to sixth aspects, the light emitting unit includes the plural light emitting elements. The power supply circuit is configured to decrease the first voltage with a decrease in the number of light emitting elements to be lit up.

With regard to the light emitting element lighting device of the eighth aspect in accordance with the present invention, in any one of the first to seventh aspects, the light emitting unit includes the plural light emitting elements. The power supply circuit is configured to, in a process of applying the first voltage to the light emitting unit, apply the first voltage to the light emitting elements at different timings with regard to at least two of the plural light emitting elements.

With regard to the light emitting element lighting device of the ninth aspect in accordance with the present invention, in any one of the first to eighth aspects, the light emitting unit includes the plural light emitting elements. The power supply circuit is configured to, in a process of applying the second voltage to the light emitting unit, apply the second voltage to all the plural light emitting elements at the same timing.

With regard to the light emitting element lighting device of the tenth aspect in accordance with the present invention, in any one of the first to ninth aspects, the power supply circuit is configured to performs constant voltage control in a process of applying the first voltage to the light emitting unit and perform constant current control in a process of applying the second voltage to the light emitting unit.

With regard to the light emitting element lighting device of the eleventh aspect in accordance with the present invention, in any one of the first to ninth aspects, the power supply circuit includes: a constant voltage source configured to apply the first voltage to the light emitting unit; and a constant current source configured to supply a constant current to the light emitting unit to apply the second voltage to the light emitting unit.

With regard to the light emitting element lighting device of the twelfth aspect in accordance with the present invention, in any one of the first to eleventh aspects, the light emitting element is an organic EL element.

The lighting fixture of the thirteenth aspect in accordance with the present invention includes a light emitting element lighting device according to any one of the first to twelfth aspects and a fixture body configured to hold the light emitting element lighting device.

DESCRIPTION OF EMBODIMENTS

First Embodiment

Figure 1:
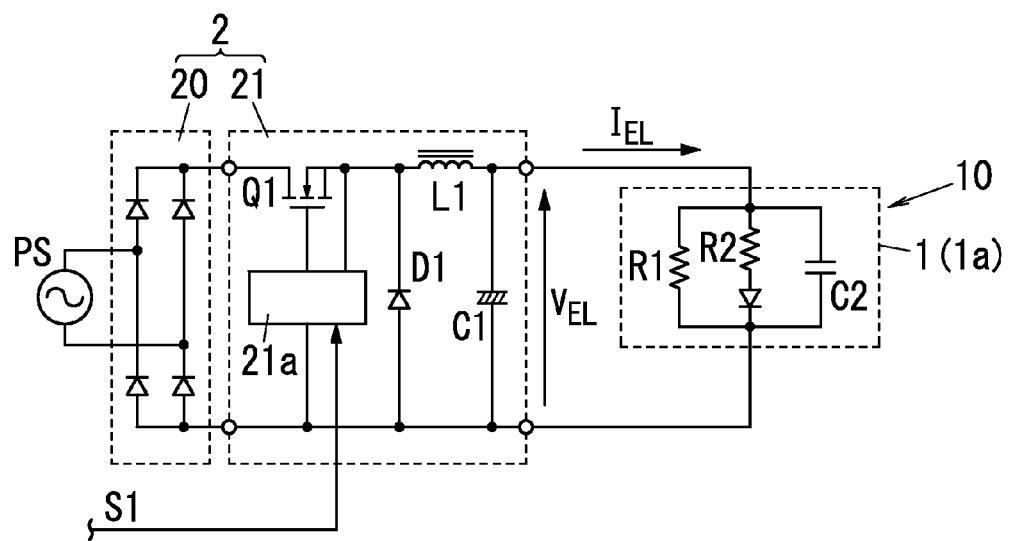
FIG. 1 is a block circuit diagram illustrating the light emitting element lighting device of the first embodiment.

As shown in FIG. 1, the light emitting element lighting device (lighting device) of the present embodiment includes a light emitting unit 10 including one or more (one, in the present embodiment) light emitting elements 1 ($1a$), and a power supply circuit 2 designed to supply a voltage (supply voltage) to the light emitting unit 10. The power supply circuit 2 is configured to, in a process of lighting up the light emitting unit 10 extinguished, apply a first voltage V1 lower than a lighting start voltage Vs of the light emitting element 1 ($1a$) to the light emitting unit 10 first, and then apply a second voltage V2 higher than the lighting start voltage Vs to the light emitting unit 10. Further, the power supply circuit 2 is configured to, in a process of increasing the voltage (supply voltage) supplied to the light emitting unit 10 from the first voltage V1 to the second voltage V2, increase the voltage (supply voltage) supplied to the light emitting unit 10 in accordance with a change curve indicating that a rate of increase (rate of increase in the supply voltage) is decreased as a voltage value (voltage value of the supply voltage) becomes closer to the second voltage V2.

The following explanation referring to FIG. 1 to FIG. 6 is made to the light emitting element lighting device of the present embodiment.

FIG. 1 shows a circuit diagram of the light emitting element lighting device of the present embodiment, and the present light emitting element lighting device includes the light emitting unit 10 constituted by the single organic EL (electroluminescent) light emitting element 1 ($1a$) and the power supply circuit 2 configured to supply the voltage (supply voltage) to the light emitting unit 10. In brief, in the present embodiment, the organic EL light emitting element 1 serves as a light emitting element of the light emitting unit 10.

The organic EL light emitting element (organic EL element) $1a$ constituting the light emitting unit 10 is designed to emit light in response to application of a DC voltage in a prescribed direction. The organic EL light emitting element $1a$ is driven by a DC voltage supplied from the power supply circuit 2. The lighting start voltage Vs is defined as a voltage which allows the light emitting element 1 to light. With regard to the light emitting element 1 (i.e., an organic LED), the lighting start voltage Vs is equal to a forward voltage drop. As shown in FIG. 1, the organic EL element $1a$ is illustrated as an equivalent circuit in which a leak resistor R1, a series equivalent resistor R2, and an equivalent capacitor C2 are connected in parallel with each other.

The power supply circuit 2 is configured to supply the voltage (supply voltage) to the light emitting unit 10. The supply voltage is a DC voltage. The power supply circuit 2 is constituted by a rectification circuit 20 and a DC voltage conversion circuit 21.

The rectification circuit 20 is a diode bridge, and performs full-wave rectification on an AC voltage supplied from an AC power source PS.

The DC voltage conversion circuit 21 lowers a pulse voltage produced through the full-wave rectification by the rectification circuit 20 and converts it into a DC voltage with a predetermined voltage value. The DC voltage conversion circuit 21 provides an output voltage $V_{EL}$ defining the supply voltage from the power supply circuit 2 to the light emitting unit 10.

The DC voltage conversion circuit 21 is a converter of a step-down chopper type, and includes a switching element Q1 constituted by a MOSFET, a driver circuit $21a$ configured to drive the switching element Q1, a diode D1 for regeneration, a choke coil L1, and a capacitor C1. The switching element Q1 is connected between output terminals of the rectification circuit 20 via a series circuit of the choke coil L1 and the capacitor C1. The diode D1 has a cathode connected to a connection point of the switching element Q1 and the choke coil L1. The diode D1 has an anode connected to the lower side output terminal of the rectification circuit 20. Further, connected between both ends of the capacitor C1 is the light emitting unit 10.

The driver circuit $21a$ is constituted by a microcomputer, for example. The driver circuit $21a$ turns on and off the switching element Q1 at a switching frequency which is a high frequency (e.g., several tens of kHz to several MHz) to perform chopping operation. In other words, the driver circuit $21a$ varies a duty cycle of the switching element Q1 according to a dimming signal S1 inputted from an external device, and a DC voltage with a desired magnitude is supplied to the light emitting unit 10 via PWM control.

Note that, the operation of the step-down chopper circuit is well known, and the detailed explanation of the DC voltage conversion circuit 21 is deemed unnecessary. In the present embodiment, the DC voltage conversion circuit 21 is constituted by a step-down chopper, but the DC voltage conversion circuit 21 is not limited to such a step-down chopper. The DC voltage conversion circuit 21 may be constituted by a boost chopper, a step-down chopper, a flyback converter, a forward converter, a half-bridge converter, a full-bridge converter, a push-pull converter, or another switching power supply. Alternatively, the DC voltage conversion circuit 21 may be constituted by a combination of these circuits. In the present embodiment, the DC voltage conversion circuit 21 converts the AC voltage supplied from the AC power source PS into the DC voltage with a desired voltage value. Alternatively, a DC power source may be used as a power source, and a DC voltage supplied from the DC power source is converted into a DC voltage with a desired voltage value by the DC voltage conversion circuit 21.

Figure 3:
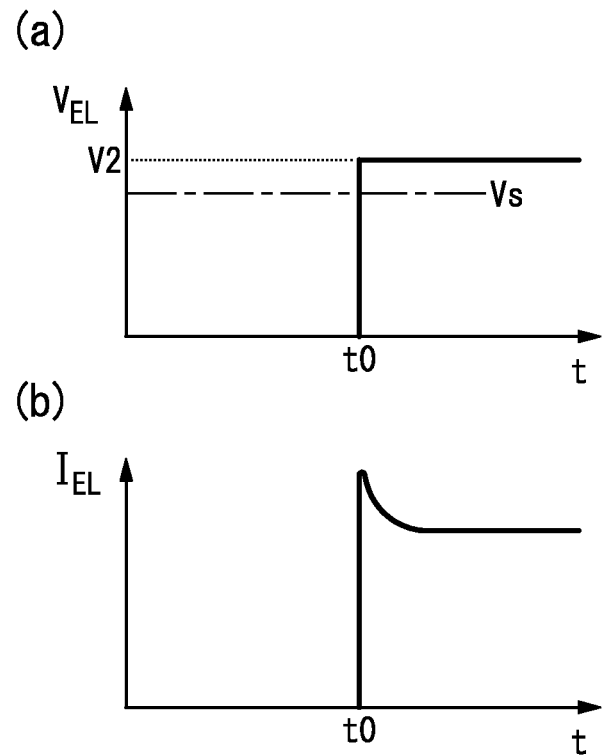
FIG. 3 is a waveform chart illustrating the voltage applied to and the current flowing through the organic EL element.

In this regard, as shown in FIG. 3 (a), when the DC voltage conversion circuit 21 increases the output voltage (supply voltage) $V_{EL}$ from zero to V2 instantly at the time t0 after activation, the organic EL element 1a lights because the voltage V2 is defined by a voltage higher than the lighting start voltage Vs of the organic EL element 1a. At this time, a current starts to flow into the organic EL element 1a. Since the organic EL element 1a has the capacitance component as mentioned above, a surge current flows into the organic EL element 1a as shown in FIG. 3 (b). Hence, a surge occurs in a load current (current flowing through the organic EL element 1) $I_{EL}$.

Figure 2:
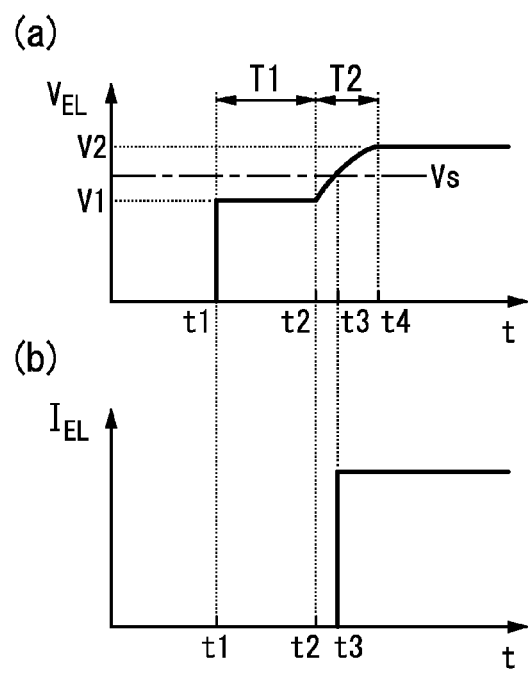
FIG. 2 is a waveform chart illustrating the voltage applied to and the current flowing through the organic EL element.

In view of the above, in the present embodiment, as shown in FIG. 2 (a), the DC voltage conversion circuit 21 increases the output voltage $V_{EL}$ from zero to the first voltage V1 (<V2) instantly at the time t1 after activation, and the DC voltage conversion circuit 21 keeps applying the first voltage V1 to the light emitting unit 10 until a time period (constant time period) T1 elapses from the time t1. In this regard, since the first voltage V1 is a voltage lower than the lighting start voltage Vs, the organic EL element 1a does not light. Since no current does not flow through the organic EL element 1a unless the organic EL element 1a lights, no surge occurs in the load current $I_{EL}$. Further, the constant time period T1 defining a continuous time period in which the first voltage V1 is applied is selected to be a time period longer than a time period necessary to complete charging up the capacitance component of the organic EL element 1a. Thereafter, at the time T2 after the constant period time T1 from the time t1, the DC voltage conversion circuit 21 increases the output voltage $V_{EL}$ from the first voltage V1 to the second voltage V2 gradually throughout a predetermined time period T2 from the time t2 to the time t4. In a process of increasing the output voltage $V_{EL}$ from the first voltage V1 to the second voltage V2, the DC voltage conversion circuit 21 increases the output voltage $V_{EL}$ in accordance with the change curve indicating that a temporal rate of increase in the output voltage $V_{EL}$ is decreased as the voltage value of the output voltage $V_{EL}$ becomes closer to the second voltage V2. The second voltage V2 is selected to be a voltage greater than the lighting start voltage Vs. When the output voltage $V_{EL}$ exceeds the lighting start voltage Vs at the time t3 before the output voltage $V_{EL}$ reaches the second voltage V2, the organic EL element 1a lights. When the organic EL element 1a lights, the load current $I_{EL}$ starts to flow through the organic EL element 1a. In this case, a change between the output voltages $V_{EL}$ before and after lighting is equal to a difference voltage between the lighting start voltage Vs and the first voltage V1. Accordingly, in contrast to an instance where the voltage applied to the organic EL element 1a is increased from zero to the second voltage V2 instantly, a change in voltage per unit time can be decreased. Hence, it is possible to reduce a surge which occurs in the load current $I_{EL}$ when the organic EL element 1a lights. For example, the driver circuit 21a of the DC voltage conversion circuit 21 stores data (e.g., a function and a table) indicative of the aforementioned change curve in its memory.

Further, the DC voltage conversion circuit 21 applies the first voltage V1 lower than the lighting start voltage Vs to the extinguished organic EL element 1a throughout a time period from the time t1 to the time t2. In this time period, the capacitance component of the organic EL element 1a is charged up. Hence, the surge which occurs in the load current $I_{EL}$ in a lighting state can be more reduced.

Furthermore, the DC voltage conversion circuit 21 varies the output voltage $V_{EL}$ from the first voltage V1 to the second voltage V2 throughout the predetermined time period T2 from the time t2. Hence, in contrast to an instance where the output voltage $V_{EL}$ is increased from zero to the second voltage V2 instantly, overshoot in the output voltage $V_{EL}$ can be suppressed.

Moreover, the DC voltage conversion circuit 21 applies the first voltage V1 throughout the constant time period T1 before applying the second voltage V2 to the organic EL element 1a. However, since the first voltage V1 is selected to be a voltage lower than the lighting start voltage Vs, no current flows through the organic EL element 1a extinguished. Consequently, the surge occurring in the load current $I_{EL}$ can be reduced like the prior art which suppresses the surge current by interposing an inductor or a resistance component, yet it is possible to suppress an unintended distortion in a waveform of a current and an increase in a loss.

Figure 21:
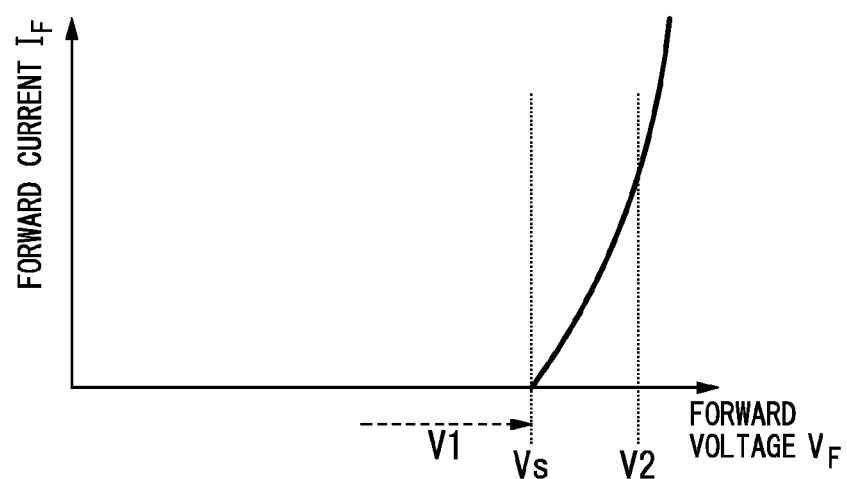
FIG. 21 is a diagram illustrating the forward voltage-forward current characteristics of the light emitting unit used in the lighting fixture of the sixth embodiment.

FIG. 21 shows forward voltage-forward current characteristics of a solid light emitting element (e.g., the organic EL element 1a and a light emitting diode). The lighting start voltage Vs is lower than a normal lighting voltage (second voltage) V2 but is close to the normal lighting voltage V2. Therefore, since the first voltage V1 can be selected to be relatively high voltage, a difference between the first voltage V1 and the second voltage V2 can be reduced. Hence, a change between the output voltages $V_{EL}$ before and after lighting can be reduced, and an effect of reducing the surge current can be more improved.

Figure 4:
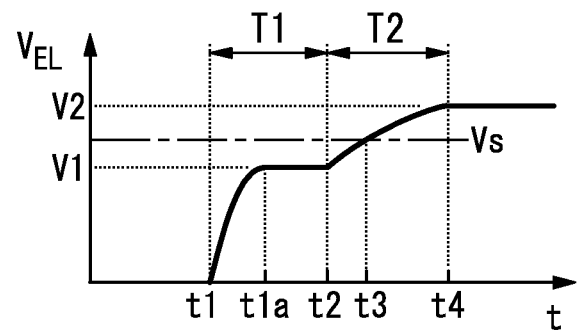
FIG. 4 is a waveform chart illustrating the voltage applied to the organic EL element.
Figure 5:
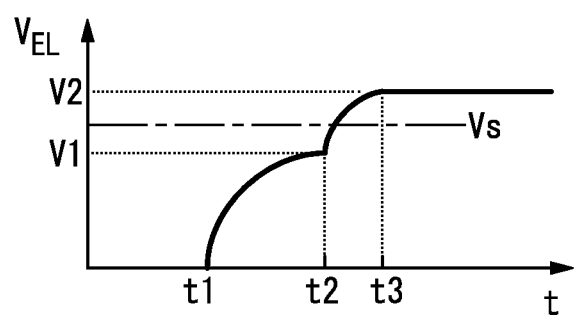
FIG. 5 is a waveform chart illustrating the voltage applied to the organic EL element.

Note that, in the present embodiment, the DC voltage conversion circuit 21 increases the output voltage $V_{EL}$ from zero to the first voltage V1 instantly at the time t1. Alternatively, the DC voltage conversion circuit 21 may increase the output voltage $V_{EL}$ from zero to the first voltage V1 gradually. For example, as shown in FIG. 4, the DC voltage conversion circuit 21 may increase the output voltage $V_{EL}$ from zero to the first voltage V1 gradually throughout a period from the time t1 to the time t1a, and keep the output voltage $V_{EL}$ equal to the first voltage V1 until the time t2, and increase the output voltage $V_{EL}$ from the first voltage V1 to the second voltage V2 gradually throughout a period from the time t2 to the time t4. Alternatively, as shown in FIG. 5, the DC voltage conversion circuit 21 may increase the output voltage $V_{EL}$ from zero to the first voltage V1 gradually throughout a period from the time t1 to the time t2, and increase the output voltage $V_{EL}$ from the first voltage V1 to the second voltage V2 gradually throughout a period from the time t2 to the time t4.

As mentioned above, the power supply circuit 2 may gradually increase the voltage applied to the light emitting unit 10 in the process of applying the first voltage V1 to the light emitting unit 10 extinguished. Since the voltage (applied voltage) applied to the light emitting unit 10 is increased gradually in order to apply the first voltage V1 to the light emitting unit 10 which is extinguished, a change in the applied voltage per unit time can be decreased. It is possible to reduce a surge which would occur when the capacitance component of the light emitting unit 10 is charged. Further, in contrast to a case where the applied voltage to the light emitting unit 10 is increased from zero to the first voltage V1 instantly, overshoot in the applied voltage can be reduced. To reduce an increase in the applied voltage per unit time when the applied voltage to the light emitting unit 10 is increased from the first voltage V1 to the second voltage V2, it is preferred that the first voltage V1 be selected to be relatively high. Even when the first voltage V1 is selected to be relatively high, it is possible to reduce a surge which would occur when the applied voltage to the light emitting unit 10 is increased from zero to the first voltage V1. Additionally, since the first voltage V1 is selected to be a voltage lower than the lighting start voltage Vs, the light emitting unit 10 is not lit during application of the first voltage V1. Therefore, it is possible to prevent an occurrence where timings for lighting start are different, which would be caused by an undesired situation where the light emitting unit 10 is turned on before application of the second voltage V2.

Further, it is preferred that the power supply circuit 2 keep a voltage increase rate of the voltage supplied to the light emitting unit 10 from the first voltage V1 to the second voltage V2 higher than a voltage increase rate of the voltage supplied to the light emitting unit 10 from zero to the first voltage V1. The light emitting unit 10 is not lit while the applied voltage to the light emitting unit 10 is increased from zero to the first voltage V1. Hence, with decreasing the voltage increase rate, an effect of reducing a surge can be improved. Additionally, the light emitting unit 10 is switched from an extinguishing state to a lighting state while the applied voltage to the light emitting unit 10 is increased from the first voltage V1 to the second voltage V2. Hence, with increasing the voltage increase rate, it is possible to shorten an intermediate state between the extinguishing state and the lighting state in a starting process to enable rapid starting. Consequently, occurrence of a surge can be suppressed yet rapid starting which shows a rapid increase in the light output can be achieved.

Figure 6:
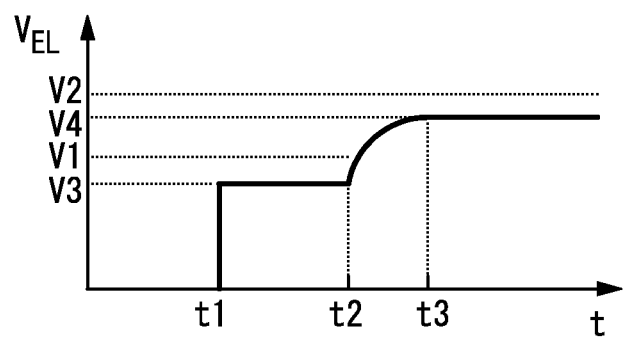
FIG. 6 is a waveform chart illustrating the voltage applied to the organic EL element.

In a dimming process, to dim the light emitting unit 10, the DC voltage conversion circuit 21 adjusts the duty cycle for the switching element Q1 according to the dimming signal S1 to cause a change in the output voltage $V_{EL}$ at lighting (i.e., the voltage level of the second voltage V2). When the second voltage V2 is decreased with a decrease in the light output, a surge current is hard to occur while the light emitting unit 10 is lit. Therefore, the first voltage may be decreased with a decrease in the second voltage V2. For example, as shown in FIG. 6, when the DC voltage conversion circuit 21 decreases the second voltage from the voltage V2 to a voltage V4 in response to the dimming signal S1, the DC voltage conversion circuit 21 decreases the first voltage from the voltage V1 to a voltage V3 in accordance with a decrease in the second voltage. Accordingly, it is possible to decrease the first voltage which is applied only to the extinguished light emitting unit 10 and gives no contribution to lighting the light emitting unit 10. Hence, power consumption by the light emitting element lighting device can be saved, and deterioration of parts constituting the light emitting element lighting device can be suppressed.

As mentioned above, the power supply circuit 2 may decrease the first voltage V1 with a decrease in the second voltage V2. When the power supply circuit 2 lowers the second voltage V2 according to a decrease in the light output (dimming rate), adjustment to the light output, or correction to the light output, such a decrease in the second voltage V2 suppresses occurrence of a surge current. In this case, with lowering the first voltage V1 according to a decrease in the second voltage V2, energy saving can be achieved while deterioration of parts can be suppressed.

Note that, as a method of controlling the first voltage V1 by the DC voltage conversion circuit 21, it is possible to employ a method in which the DC voltage conversion circuit 21 provides the first voltage V1 when the second voltage V2 in the lighting state is not less than a predetermined voltage level and does not provide the first voltage V1 when the second voltage V2 is less than the predetermined voltage level. In brief, the first voltage V1 may be selected to be zero.

Moreover, adjustment to the first voltage V1 may be conducted in a process of adjusting and/or correcting the light output in addition to a dimming process. In this case, the DC voltage conversion circuit 21 may adjust the first voltage V1 in response to an adjustment and/or correction signal for the light output which is inputted from an external device.

Note that, in the present embodiment, as a light source for the light emitting unit 10, an organic EL element in a form of a panel shape which is used as a planar light source is employed. However, a light emitting diode (LED) can be used as such a light source. Alternatively, a light source for the light emitting unit 10 may be selected from an inorganic EL panel, a planar light emitting light source which is an assembly of an LED and a light guide plate designed to guide light emitted from the LED to produce planar light emission, and a back-lit type or edge-lit type planar light source with a cold cathode fluorescent lamp.

As mentioned above, the light emitting element lighting device of the present embodiment includes the following first feature.

As for the first feature, the light emitting element lighting device includes: the light emitting unit 10 including the light emitting element 1; and the power supply circuit 2 configured to supply the supply voltage (output voltage) $V_{EL}$ to the light emitting unit 10. The power supply circuit 2 is configured to increase the supply voltage from the first voltage V1 lower than the lighting start voltage Vs of the light emitting element 1 to the second voltage V2 higher than the lighting start voltage Vs to light up the light emitting unit 10. The power supply circuit 2 is configured to, in the process of increasing the supply voltage from the first voltage V1 to the second voltage V2, decrease the rate of increase in the supply voltage as the supply voltage gets closer to the second voltage V2. In other words, the power supply circuit 2 is configured to, in the process of increasing the supply voltage from the first voltage V1 to the second voltage V2, decrease the rate of increase in the supply voltage with a decrease in a difference of the supply voltage from the second voltage V2.

Additionally, the light emitting element lighting device of the present embodiment includes the following second to seventh features as optional features.

As for the second feature, in the first feature, the power supply circuit 2 is configured to increase the supply voltage in accordance with a change curve defining the rate of increase in the supply voltage.

As for the third feature, in the first or second feature, the power supply circuit 2 is configured to increase the supply voltage from the first voltage V1 to the second voltage V2 after charging of the capacitance component of the light emitting element 1 is completed.

As for the fourth feature, in any one of the first to third features, the power supply circuit 2 is configured to increase the supply voltage from zero to the first voltage V1 gradually.

As for the fifth feature, in the fourth feature, the voltage increase rate of the supply voltage from the first voltage V1 to the second voltage V2 is greater than the voltage increase rate of the supply voltage from zero to the first voltage V1.

As for the sixth feature, in any one of the first to fifth features, the power supply circuit 2 is configured to decrease the first voltage V1 when decreasing the second voltage V2.

As for the seventh feature, in any one of the first to sixth features, the light emitting element 1 is an organic EL element.

According to the aforementioned light emitting element lighting device, when the power supply circuit 2 applies a voltage to the light emitting element 1 in order to activate a load extinguished, the power supply circuit 2 applies the first voltage V1 lower than the lighting start voltage Vs before applying the second voltage V2 higher than the lighting start voltage Vs. Additionally, in a process of increasing the voltage supplied to the load from the first voltage V1 to the second voltage V2, the power supply circuit 2 increases the supply voltage in accordance with the change curve representing that the rate of increase is decreased as the voltage value becomes closer to the second voltage V2. Hence, in contrast to a case where the voltage applied to the light emitting element 1 is increased from zero to the second voltage instantly, a rate of change in voltage per unit time in a process of increasing the voltage from the first voltage V1 to the second voltage V2 is reduced, and occurrence of a surge current can be suppressed. Further, since the supply voltage from the power supply circuit 2 to the load is increased gradually, it is possible to suppress a surge which would otherwise occur due to an instant increase in the supply voltage. Furthermore, while the first voltage V1 is applied to the load, the light emitting element 1 is extinguished and no current flows through the light emitting element 1. Hence, in contrast to a case where to suppress a surge current an inductor or a resistance component is connected, there is an advantage that an unintended distortion in a current waveform and an increase in a loss are hard to occur. Moreover, in the light emitting element 1 such as an organic EL element and an LED, the lighting start voltage Vs is relatively high and is close to the second voltage V2. Therefore, the first voltage V1 can be selected to be relatively high, and an effect of reducing a surge current can be more improved. Note that, the light emitting element 1 such as an organic EL element and an LED has the relatively high lighting start voltage Vs, and a certain time period is necessary to increase the voltage to the lighting start voltage Vs. Further, there are variations in the V-I characteristics and the capacitance component of the light emitting element 1, environments (e.g., a temperature), and control. Such variations are likely to cause a variation in a period starting from the time of starting control of the light emitting element 1 and ending at the time at which the light emitting element 1 starts to light up actually. Especially, such a variation would be well recognized in a situation where the plural light emitting elements 1 are lit up. In contrast, according to the present embodiment in accordance with the present invention, the capacitance component of the light emitting element 1 can be charged up to the first voltage V1 during application of the first voltage V1 irrespective of existence of various kinds of variations. Consequently, a time period necessary for the supply voltage to reach the second voltage V2 can be shortened in the process of increasing the supply voltage to the load from the first voltage V1 to the second voltage V2, irrespective of any conditions. Hence, a variation in the time period to the time at which the light emitting element 1 starts to light up can be suppressed. Further, application of the first voltage V1 causes a decrease in a surge, which would occur when the second voltage V2 is applied, in some extent. Thus, a rate of increase in the light output can be selected to improve a visual effect without taking occurrence of surge into consideration.

Second Embodiment

Figure 7:
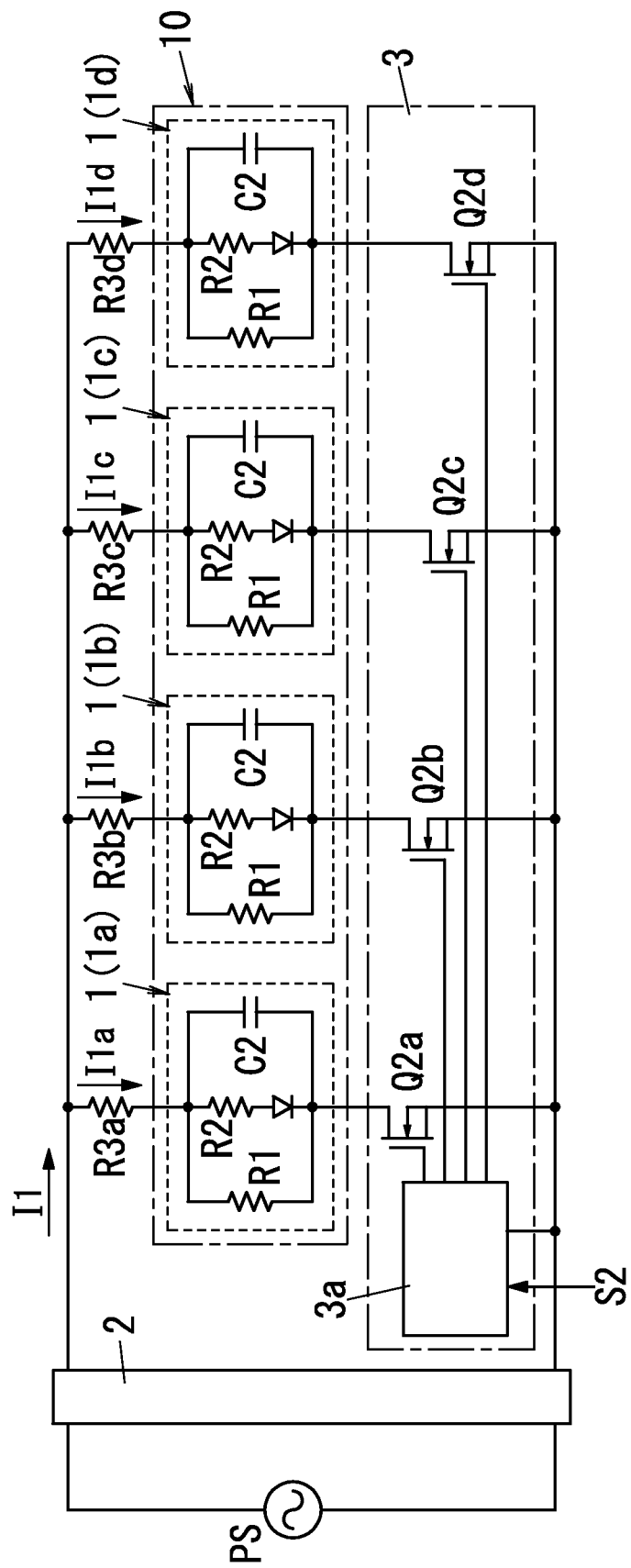
FIG. 7 is a block circuit diagram illustrating the light emitting element lighting device of the second embodiment.
Figure 8:
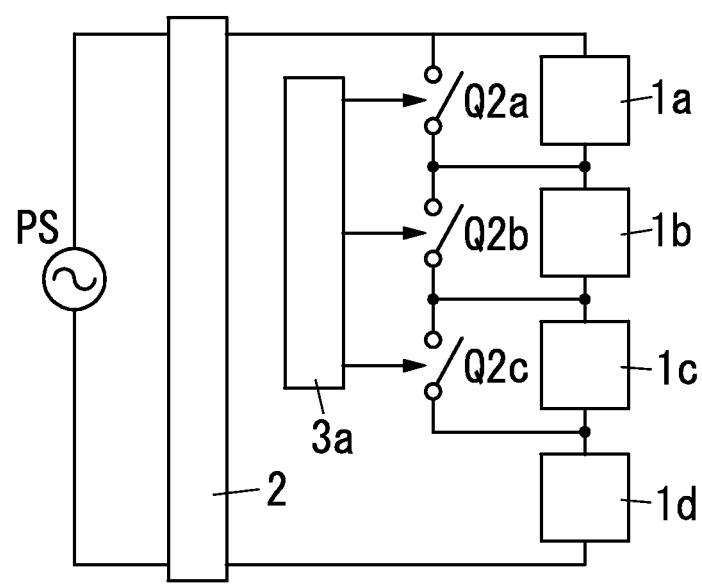
FIG. 8 is a block circuit diagram illustrating the light emitting element lighting device of the second embodiment.
Figure 9:
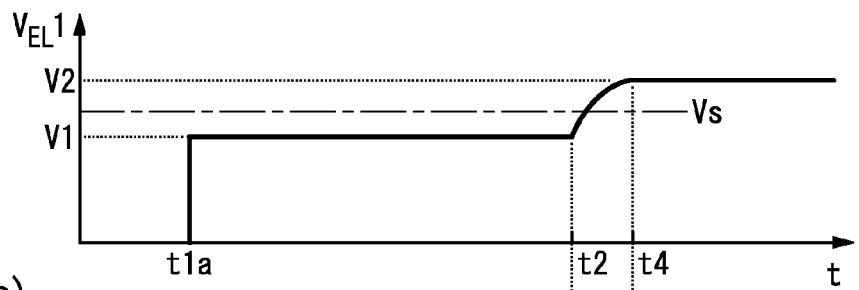
FIG. 9 is a waveform chart illustrating the voltages respectively applied to the organic EL elements $1a$ to $1d$.
Figure 9:
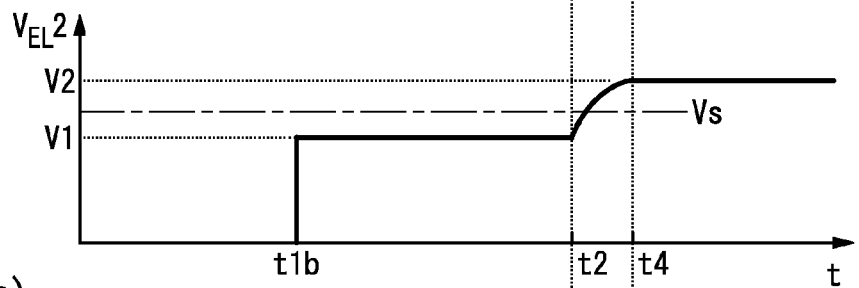
Figure 9:
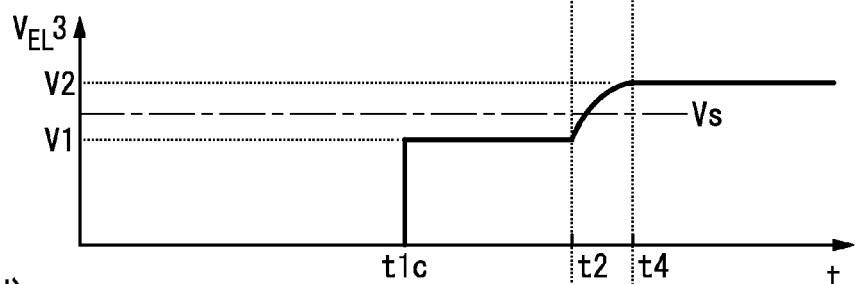
Figure 9:
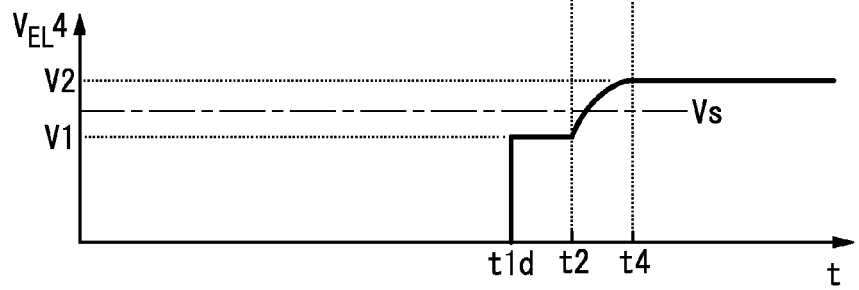

The following explanation referring to FIG. 7 to FIG. 9 is made to the light emitting element lighting device of the second embodiment in accordance with the present invention.

FIG. 7 shows a circuit diagram illustrating the light emitting element lighting device of the present embodiment. In the present embodiment, the power supply circuit 2 supplies a voltage to each of the plural (four, in the present embodiment) organic EL elements 1 (1a to 1d) in order to light up the organic EL elements 1 (1a to 1d).

The light emitting unit 10 is constituted by the four organic EL elements 1 (1a to 1d) which are connected in parallel with each other and are interposed between the output terminals of the power supply circuit 2. Each of the organic EL elements 1a to 1d has the same configuration as the organic EL element 1a described in the first embodiment, and explanations thereof are deemed unnecessary.

Interposed between the output terminals of the power supply circuit 2 is a parallel circuit of: a series circuit of a resistor R3a, the organic EL element 1a, a switching element Q2a; a series circuit of a resistor R3b, the organic EL element 1b, a switching element Q2b; a series circuit of a resistor R3c, the organic EL element 1c, a switching element Q2c; and a series circuit of a resistor R3d, the organic EL element 1d, a switching element Q2d. Additionally, switching control of the switching elements Q2a to Q2d is performed by a control circuit R3a.

The control circuit 3a individually turns on and off the switching elements Q2a to Q2d according to a lighting control signal S2 inputted from an external device. When the switching elements Q2a to Q2d are turned on, the voltages are supplied to the corresponding organic EL elements 1a to 1d, respectively. For example, the control circuit 3a is constituted by a microcomputer.

The operation of the present light emitting element lighting device is described below with reference to FIG. 9 (a) to (d). When an AC voltage is supplied to the power supply circuit 2 from the AC power source PS, the power supply circuit 2 provides the predetermined first voltage V1 lower than the lighting start voltage Vs. The control circuit 3a still turns off all the switching elements Q2a to Q2d at the time when the light emitting element lighting device is turned on (receives power). Even when the first voltage V1 is supplied from the power supply circuit 2, no voltage is applied to each of the organic EL elements 1a to 1d. Subsequently, the control circuit 3a turns on the switching elements Q2a, Q2b, Q2c, and Q2d at the time t1a, t1b, t1c, and t1d respectively in order, thereby applying the first voltage V1 to the organic EL elements 1a to 1d in this order (see FIG. 9 (a) to (d)). The power supply circuit 2 starts to increase the voltage (supply voltage) applied to the light emitting unit 10 from the first voltage V1 to the second voltage V2 at the time t2 after a lapse of a predetermined time period from the time when all the switching elements Q2a to Q2d are turned on. Each of the organic EL elements 1a to 1d is lit up when the applied voltage (supply voltage) reaches the lighting start voltage Vs. Accordingly, it is possible to light up the plural organic EL elements 1a to 1d simultaneously.

As mentioned above, in the present embodiment, the light emitting unit 10 includes the plural light emitting elements 1 (organic EL elements 1a to 1d). The power supply circuit 2 is configured to, in the process of applying the first voltage V1 to the light emitting unit 10, apply the first voltage V1 to the light emitting elements 1 at different timings with regard to at least two of the plural light emitting elements 1. Since the first voltage V1 is applied to the light emitting elements 1 at different timings, it is possible to avoid superimposition of surge components which would occur due to application of the first voltage V1. Hence, stress which occurs on the power supply circuit 2 can be suppressed. In this regard, when the timings of applying the first voltage V1 to the plural light emitting elements 1 are made different from each other, an effect of reducing the surge component can be improved with an increase in the number of different timings. When the timings of applying the first voltage V1 to all the light emitting elements 1 are made different from each other, the effect of reducing the surge component can be maximized. Besides, also in the present embodiment, in the process of applying the first voltage V1 to the light emitting element 1, the power supply circuit 2 may increase the applied voltage (supply voltage) from zero to the first voltage V1 gradually.

Further in the present embodiment, the light emitting unit 10 includes the plural light emitting elements 1 (organic EL elements 1a to 1d). The power supply circuit 2 is configured to, in the process of applying the second voltage V2 to the light emitting unit 10, apply the second voltage V2 to all the plural light emitting elements 1 at the same timing. Since the first voltage V1 is lower than the lighting start voltage Vs, the light emitting element 1 is not lit while the first voltage V1 is applied to the light emitting element 1. In contrast, since the second voltage V2 is higher than the lighting start voltage Vs, the light emitting element 1 is lit up when the second voltage V2 is applied to the light emitting element 1. Since the second voltage V2 is applied to all the light emitting elements 1 at the same timing, the respective light emitting elements 1 can be lit up at the same timing. Accordingly, the plural light emitting elements 1 start to be lit up simultaneously rather than at different timings. Hence, rapid starting which shows a rapid increase in the light output can be achieved.

Furthermore in the present embodiment, to change the number of organic EL elements to be lit up, selective lighting control in which the control circuit 3a lights up some of the organic EL elements 1a to 1d or detachment of some of the organic EL elements 1a to 1d may be performed. Note that, since the four organic EL elements 1a to 1d are connected in parallel with each other, any of the organic EL elements 1a to 1d can be detached freely.

As for the circuit shown in FIG. 7, when the number of organic EL elements to be lit up is decreased while the output voltage from the power supply circuit 2 is not changed, a surge current which occurs in a whole circuit of the organic EL elements is decreased with a decrease in the number of organic EL elements to be lit. Hence, circuit stress on the power supply circuit 2 can be reduced. Therefore, it is preferred that the power supply circuit 2 decrease the voltage value of the first voltage V1 according to the number of organic EL elements to be lit. With decreasing the first voltage, power consumption can be reduced and stress on circuit components can be reduced.

Note that, as shown in FIG. 8, the four organic EL elements 1a to 1d are connected in series with each other and are interposed between the output terminals of the power supply circuit 2 and the switching elements Q2a to Q2c are connected in parallel with three of the four organic EL elements 1a to 1d respectively. In this case, the first voltage V1 can be applied to the organic EL elements 1a to 1d in order. In brief, the switching elements Q2a to Q2c are connected in parallel with the organic EL elements 1a to 1c respectively. While all the switching elements Q2a to Q2c are turned on, the first voltage V1 is applied to only the organic EL element 1a. After that, when the switching elements Q2a to Q2c are turned off one by one in order, the number of organic EL elements 1 to which the power supply circuit 2 applies the voltage (supply voltage) is increased by one. Hence, with adjusting the output voltage $V_{EL}$ from the power supply circuit 2 in response to an increase in the number of organic EL elements 1 to which the power supply circuit 2 applies the voltage (supply voltage), the first voltage V1 can be applied to the four organic EL elements 1a to 1d in order. With increasing the output voltage $V_{EL}$ by the power supply circuit 2 after the passage of a predetermined time period from the time when the first voltage V1 is applied to all the organic EL elements 1a to 1d, it is possible to apply the second voltage V2 to the organic EL elements 1a to 1d.

Also in the circuit shown in FIG. 8, with selectively turning on and off the switching elements Q2a to Q2c by the control circuit 3a, the number of organic EL elements 1 to be lit can be changed. When the control circuit 3a turns on and off the switching elements Q2a to Q2c selectively, both ends of each of the corresponding organic EL elements 1a to 1c are short-circuited to each other, and thus the number of organic EL elements 1 to be lit is decreased. Since the voltage value of the voltage applied to each of the organic EL elements 1 to be lit is increased with a decrease in the number of organic EL elements 1 to be lit, the power supply circuit 2 may decrease the voltage value of the first voltage V1 in accordance with the number of organic EL elements 1 to be lit. With decreasing the first voltage V1, power consumption can be reduced and stress on circuit components can be reduced.

In this regard, the power supply circuit 2 determines the number of organic EL elements to be lit, based on the output voltage (supply voltage) $V_{EL}$ varied with the number of organic EL elements, an electric characteristic value of the output current (load current) $I_{EL}$, an output from a detection switch designed to mechanically detect attachment or detachment of the organic EL element 1, or the lighting control signal S2 inputted into the control circuit 3a. The power supply circuit 2 varies the first voltage V1 supplied to the light emitting unit 10 extinguished based on a result of determination of the number (lighting number) of organic EL elements 1 to be lit.

Note that, the power supply circuit 2 may decrease the first voltage V1 with a decrease in the lighting number. Alternatively, the power supply circuit 2 may be configured to provide the first voltage V1 when the lighting number is not less than a predetermined number and may be configured to not provide the first voltage V1 when the lighting number is less than the predetermined number.

Accordingly, in a process of applying the first voltage V1 to the light emitting unit 10, the power supply circuit 2 may decrease the first voltage V1 with a decrease in the number of light emitting elements 1 to be lit up.

For example, the lighting number of the light emitting unit 10 is decreased when the selective lighting control or the detachment is performed. When the lighting number is decreased in a case where the light emitting unit 10 is constituted by a series circuit of the plural light emitting elements 1, the applied voltage per one light emitting element 1 is increased, and thus the excess first voltage V1 is applied. In this situation, the first voltage V1 may exceed the lighting start voltage Vs, and this may cause a distortion in a current waveform and an excess stress on an element. Therefore, when the lighting number of the light emitting unit 10 is decreased, it is preferred that the first voltage V1 be decreased according to the lighting number. With avoiding that an excessive voltage is applied as the first voltage V1, a stress on the power supply circuit 2 can be reduced.

Alternatively, when the lighting number is decreased in a case where the light emitting unit 10 is constituted by a parallel circuit of the plural light emitting elements 1, a surge current in a whole circuit of the light emitting elements 1 is decreased. Thus, stress on the lighting circuit can be reduced and in some cases a decrease in the first voltage V1 causes no problem. Hence, when the lighting number of the light emitting unit 10 is decreased, it is preferred that the first voltage V1 be decreased according to the lighting number. With avoiding that an excessive voltage is applied as the first voltage V1, a stress on the power supply circuit 2 can be reduced.

Note that, in the present embodiment, as a light source of the light emitting unit 10, an organic EL element in a form of a panel shape which is used as a planar light source is employed. However, a light emitting diode (LED) can be used as such a light source. Alternatively, a light source for the light emitting unit 10 may be selected from an inorganic EL panel, a planar light emitting light source which is an assembly of an LED and a light guide plate designed to guide light emitted from the LED to produce planar light emission, and a back-lit type or edge-lit type planar light source with a cold cathode fluorescent lamp. Besides, in the present embodiment, the organic EL elements 1a, 1b, 1c, and 1d are the same type and have the same dimensions.

As mentioned above, the light emitting element lighting device of the present embodiment includes at least one of the following eighth to tenth features in addition to the first feature. Additionally, the light emitting element lighting device of the present embodiment may include the second to seventh features selectively.

As for the eighth feature, the light emitting unit 10 includes the plural light emitting elements 1. The power supply circuit 2 is configured to decrease the first voltage V1 with a decrease in the number of light emitting elements 1 to be lit up.

As for the ninth feature, the light emitting unit 10 includes the plural light emitting elements 1. The power supply circuit 2 is configured to, in the process of applying the first voltage V1 to the light emitting unit 10, apply the first voltage V1 to the light emitting elements 1 at different timings with regard to at least two of the plural light emitting elements 1.

As for the tenth feature, the light emitting unit 10 includes the plural light emitting elements 1. The power supply circuit 2 is configured to, in the process of applying the second voltage V2 to the light emitting unit 10, apply the second voltage V2 to all the plural light emitting elements 1 at the same timing.

Third Embodiment

The following explanation referring to FIG. 10 to FIG. 14 is made to the light emitting element lighting device of the third embodiment in accordance with the present invention.

Figure 10:
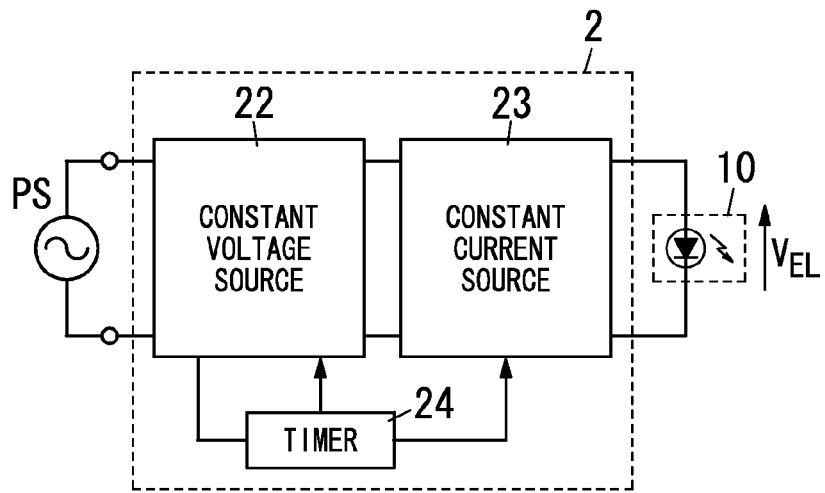
FIG. 10 is a block circuit diagram illustrating the light emitting element lighting device of the third embodiment.

FIG. 10 shows a circuit diagram illustrating the light emitting element lighting device of the present embodiment. The power supply circuit 2 includes a constant voltage source 22, a constant current source 23, and a timer 24. The constant voltage source 22 is designed to receive power from the AC power source PS and supply the constant first voltage V1 to the light emitting unit 10. The constant current source 23 is located on an output side of the constant voltage source 22. The constant current source 23 is designed to perform constant current control in a process of applying the second voltage V2 to the light emitting unit 10.

Figure 13:
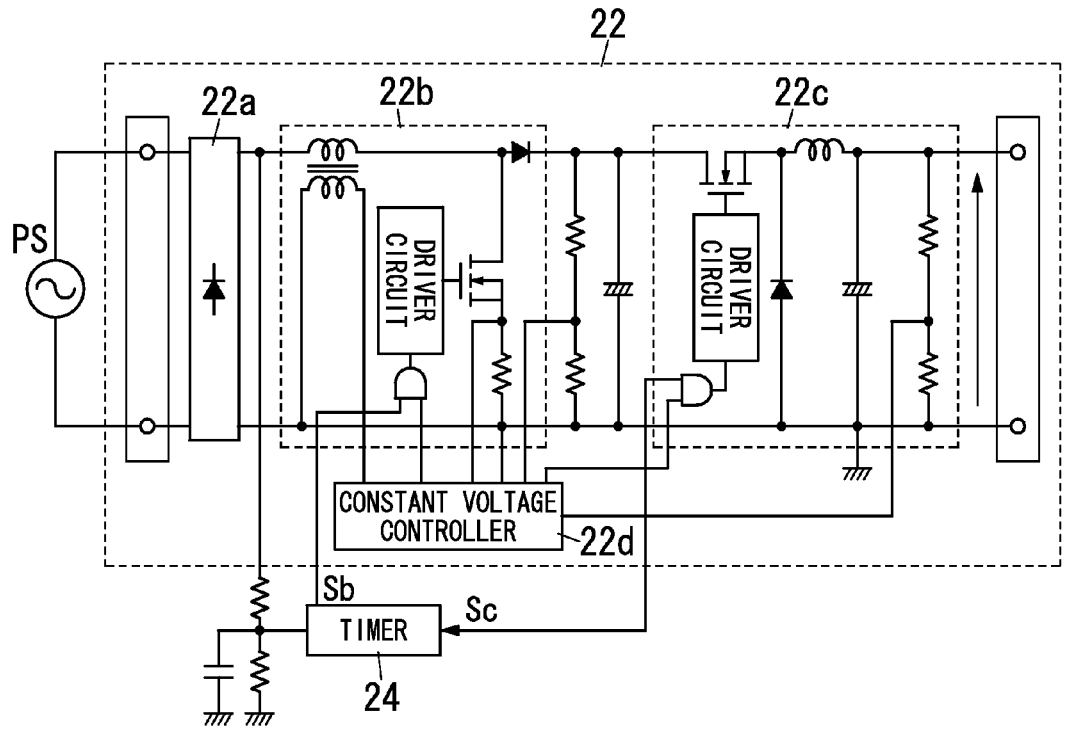
FIG. 13 is a block diagram illustrating a constant voltage source constituting the power supply circuit of the light emitting element lighting device of the third embodiment.

FIG. 13 shows an example of the circuit configuration of the constant voltage source 22. The constant voltage source 22 includes a rectification circuit 22a, a boost chopper circuit 22b, a step-down chopper circuit 22c, and a constant voltage controller 22d. The rectification circuit 22a is constituted by a diode bridge, for example. The rectification circuit 22a is designed to rectify an AC voltage from the AC power source PS. The boost chopper circuit 22b has a well-known circuit configuration. The boost chopper circuit 22b is designed to output a DC voltage obtained by increasing a rectified output from the rectification circuit 22a. The step-down chopper circuit 22c has a well-known circuit configuration. The step-down chopper circuit 22c is designed to output a constant DC voltage (output voltage) obtained by lowering an output from the boost chopper circuit 22b. The output voltage from the step-down chopper circuit 22c is fed back to the constant voltage controller 22d. The constant voltage controller 22d controls switching operation of each of the boost chopper circuit 22b and the step-down chopper circuit 22c so as to keep the output voltage constant. Further, the constant voltage controller 22d determines whether the boost chopper circuit 22b performs the switching operation, according to a control signal Sb from the timer 24. The constant voltage controller 22d determines whether the step-down chopper circuit 22c performs the switching operation, according to a control signal Sc inputted from the timer 24.

Figure 14:
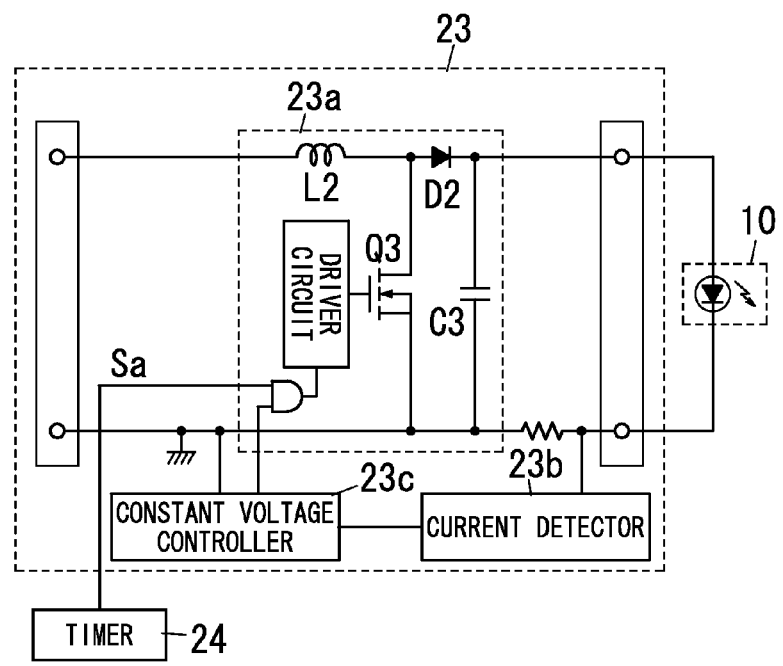
FIG. 14 is a block diagram illustrating a constant current source constituting the power supply circuit of the light emitting element lighting device of the third embodiment.

FIG. 14 shows an example of the circuit configuration of the constant current source 23. The constant current source 23 includes a boost chopper circuit 23a, a current detector 23b, and a constant current controller 23c. The current detector 23b is designed to measure the output current. The constant current controller 23c is designed to control switching operation of the boost chopper circuit 23a so as to keep the output current constant. The boost chopper circuit 23a has a well-known circuit configuration. The boost chopper circuit 23a includes an inductor L2, a diode D2, a switching element Q2, and a capacitor C3. The boost chopper circuit 23a is designed to output a voltage obtained by increasing the output voltage from the constant voltage source 22. The constant current controller 23c turns on and off the switching element Q3 based on the measured value of the current inputted from the current detector 23b to keep the output current from the boost chopper circuit 23a substantially constant. Further, the constant current controller 23c determines whether the boost chopper circuit 23a performs the switching operation, according to a control signal Sa inputted from the timer 24.

The light emitting unit 10 is connected between output terminals of the constant current source 23. The light emitting unit 10 is constituted by the organic EL element 1a mentioned in the first embodiment, and an explanation thereof is deemed unnecessary.

Figure 12:
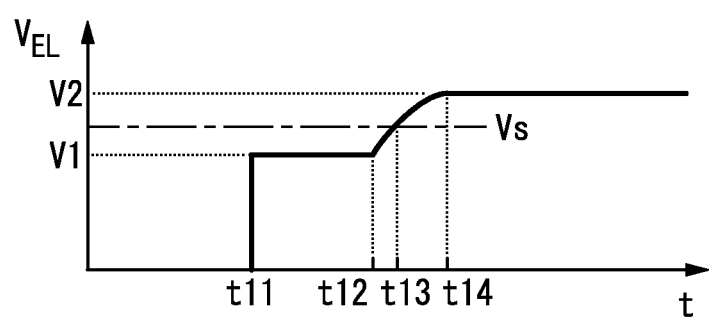
FIG. 12 is a waveform chart illustrating the voltage applied to the organic EL elements.

FIG. 12 shows a waveform chart illustrating the voltage $V_{EL}$ supplied to the light emitting unit 10. When power is supplied to the power supply circuit 2 from the AC power source PS, the timer 24 outputs the control signals Sb and Sc to the constant voltage source 22 so as to allow the constant voltage source 22 to start to perform the switching operation to provide the first voltage V1 (time t11).

At this time, the timer 24 terminates the operation of the constant current source 23. However, since the constant current source 23 has a configuration which is similar to a boost chopper, the first voltage V1 provided from the constant voltage source 22 is supplied to the light emitting unit 10 through the inductor L2 and the diode D2. Hence, the first voltage V1 is supplied to the light emitting unit 10, and the capacitance component of the light emitting unit 10 is charged up. Note that, since the first voltage V1 is lower than the lighting start voltage Vs, the light emitting unit 10 is not lit up at this time.

The timer 24 counts an elapsed time from the time when the light emitting element lighting device is turned on. At the time t12 after a lapse of a predetermined time period from the time when the light emitting element lighting device is turned on, the timer 24 outputs the control signal Sa to the constant current source 23 so as to allow the constant current source 23 to start to perform the switching operation. When starting its operation, the constant current source 23 increases a current supplied to the light emitting unit 10 gradually, and keeps constant the current flowing through the light emitting unit 10. Accordingly, the voltage supplied to the light emitting unit 10 is increased from the first voltage V1 to the second voltage V2 gradually throughout a duration from the time t12 to the time t14, and the second voltage V2 which is substantially constant is supplied to the light emitting unit 10 after the time t14. Note that, the voltage supplied to the light emitting unit 10 from the constant current source 23 reaches the lighting start voltage Vs at the time t13 before the supply voltage to the light emitting unit 10 is increased up to the second voltage V2, and thus the light emitting unit 10 is lit up.

Besides, a light emitting element such as an organic EL element and an LED has an inherent variation in the forward voltage Vf, and the forward voltage Vf is susceptible to an ambient temperature. Thus, the light output is easily varied with such an influence. However, in the light emitting element lighting device of the present embodiment, the constant current source 23 performs constant current control in a normal lighting operation, thereby keeping substantially constant the current flowing through the light emitting unit 10. Hence, a variation in the light output can be suppressed.

Accordingly, in the present embodiment, since a function of applying the first voltage V1 is provided to the constant voltage source 22 which is designed originally to supply power to the constant current source 23, the number of parts constituting the light emitting element lighting device can be reduced and the light emitting element lighting device can be downsized. Note that, even if the output voltage from the constant voltage source 22 is varied, the current supplied to the light emitting unit 10 is kept substantially constant by the constant current source 23 after the light emitting unit 10 is lit up. Hence, when the constant voltage source 22 increases the output voltage after the light emitting unit 10 is lit up, the output current from the constant voltage source 22 is decreased. Therefore, power consumption by the constant voltage source 22 can be reduced.

Figure 11:
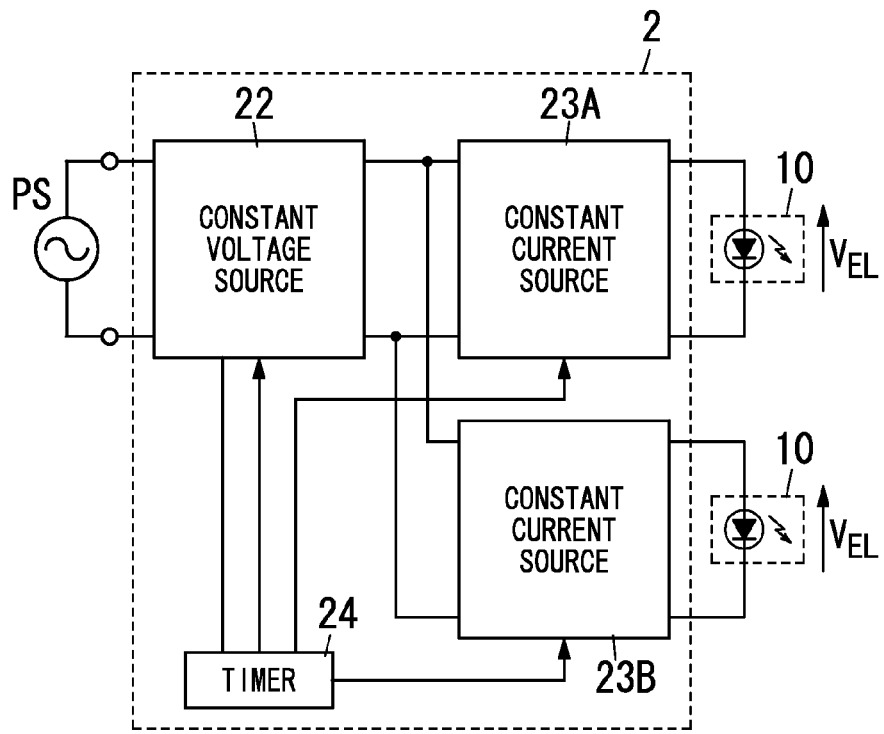
FIG. 11 is a block circuit diagram illustrating the light emitting element lighting device of the third embodiment.

Alternatively, in the present embodiment, it is possible to employ a multiple lighting control circuit in which, as shown in FIG. 11, plural (two, in the circuit example shown in FIG. 11) constant current sources 23 (23A and 23B) are connected to the single constant voltage source 22 and the constant current sources 23A and 23B light up the respective light emitting units 10.

According to this multiple lighting control circuit, the constant voltage source 22 is used in common to provide the first voltage V1 to the plural light emitting units 10. Hence, the number of parts constituting the light emitting element lighting device can be more reduced and the light emitting element lighting device can be more downsized.

Note that, in the process of increasing the output voltage from zero to the first voltage V1, the constant voltage source 22 may increase the output voltage instantly or gradually. In a case where the constant voltage source 22 increases the output voltage from zero to the first voltage V1 instantly, a starting period can be shortened. In contrast, in a case where the constant voltage source 22 increases the output voltage from zero to the first voltage V1 gradually, an increase rate of the output voltage per unit time can be reduced. When the first voltage V1 is supplied to the light emitting unit 10 in such a manner, it is possible to reduce surge which would otherwise occur when the capacitance component of the light emitting unit 10 is charged up. Further, it is possible to suppress overshoot in the output voltage which would otherwise occur due to a rapid increase in the output voltage caused by the constant voltage source 22. Thus, stress on circuit components can be reduced.

Besides, in the present embodiment, when the constant current source 23 is constituted by a step-down chopper, the voltage supply to the light emitting unit 10 is not performed unless the switching element of the step-down chopper starts its switching operation. In contrast, in the present embodiment, the constant current source 23 is constituted by a boost chopper. Therefore, even when the switching element of the boost chopper does not perform the switching operation, the output voltage from the constant voltage source 22 is supplied to the light emitting unit 10 via the constant current source 23. Hence, the first voltage V1 can be supplied to the light emitting unit 10 before the constant current source 23 starts its operation to light up the light emitting unit 10. Consequently, a surge current which would otherwise occur at the time of starting to light up the light emitting unit 10 can be suppressed.

As mentioned above, the light emitting element lighting device of the present embodiment includes the following eleventh feature in addition to the first feature. In the eleventh feature, the power supply circuit 2 includes the constant voltage source 22 configured to apply the first voltage V1 to the light emitting unit 10; and the constant current source 23 configured to supply the constant current to the light emitting unit 10 to apply the second voltage V2 to the light emitting unit 10. Additionally, the light emitting element lighting device of the present embodiment may include the second to tenth features selectively.

Fourth Embodiment

The following explanation referring to FIG. 15 to FIG. 18 is made to the light emitting element lighting device of the fourth embodiment in accordance with the present invention.

Figure 15:
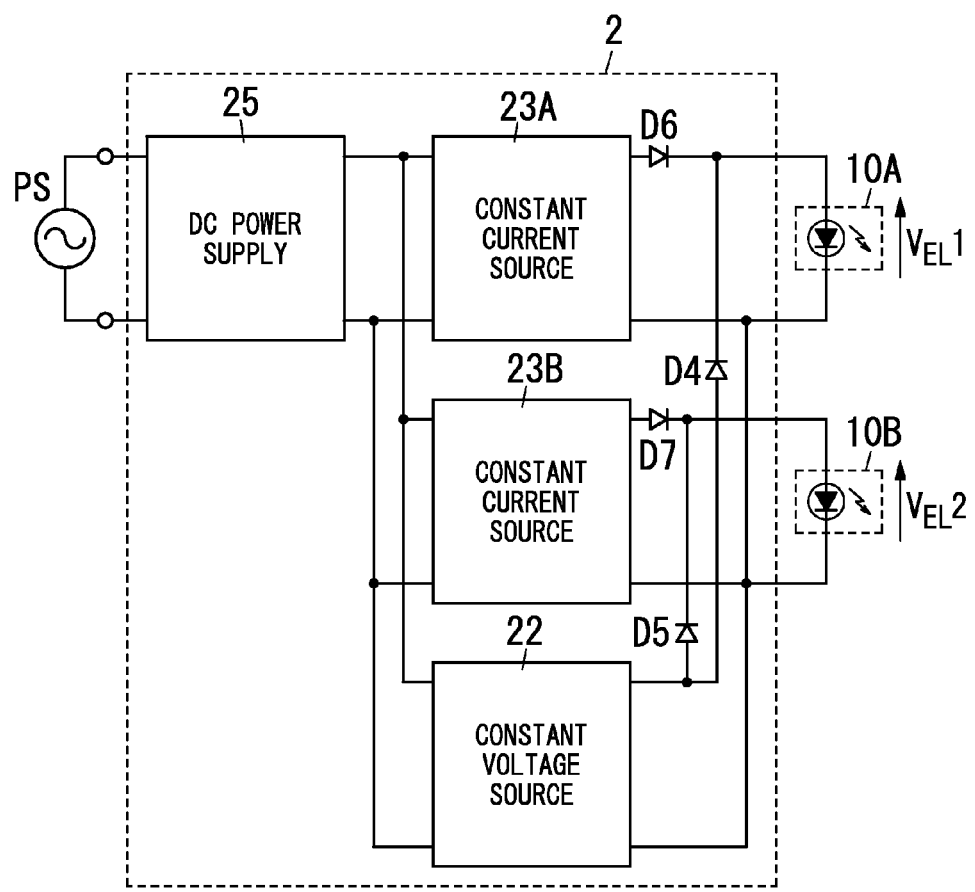
FIG. 15 is a block circuit diagram illustrating the light emitting element lighting device of the fourth embodiment.

FIG. 15 shows a circuit diagram illustrating the light emitting element lighting device of the present embodiment. In the present embodiment, the power supply circuit 2 includes a DC power source 25, the constant voltage source 22, and the constant current sources 23A and 23B. The DC power source 25 is designed to convert an AC voltage supplied from the AC power source PS into a DC voltage. Each of the constant voltage source 22 and the constant current sources 23A and 23B receives the DC voltage from the DC power source 25 and operates with the received DC voltage.

The light emitting units 10 (10A and 10B) are connected between the output terminals of the constant voltage source 22 via diodes D4 and D5, respectively. In brief, the light emitting units 10A and 10B are connected in parallel with each other and interposed between the output terminals of the constant voltage source 22.

Further, the light emitting unit 10A is connected between the output terminals of the constant current source 23A via a diode D6, and the light emitting unit 10B is connected between the output terminals of the constant current source 23B via a diode D7.

Accordingly, in the present embodiment, the single constant voltage source 22 is connected in common to the two constant current sources 23A and 23B. Each of the constant voltage source 22 and the constant current sources 23A and 23B incorporates therein a timer (not shown) designed to count an elapsed time from the time when the light emitting element lighting device is turned on, and is designed to change its output according to the elapsed time counted by its timer.

Figure 16:
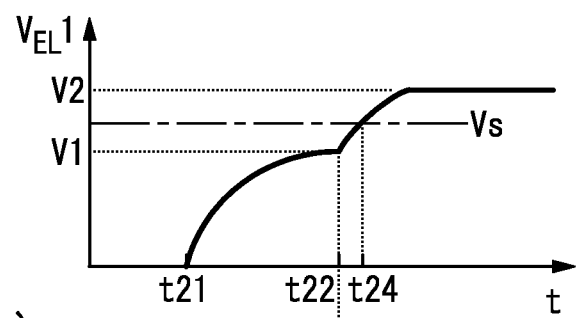
FIG. 16 is a waveform chart illustrating the voltage applied to the light emitting unit of the light emitting element lighting device of the fourth embodiment.
Figure 16:
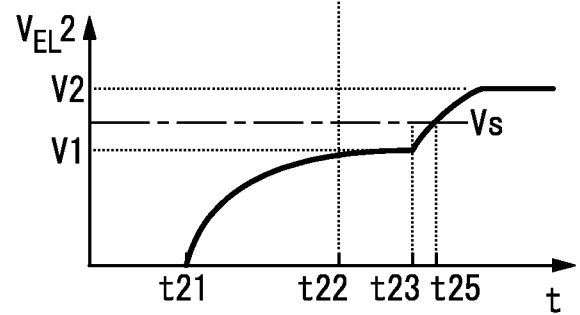

FIG. 16 (a) shows a waveform chart of the voltage $V_{EL}$ ($V_{EL1}$) applied to the light emitting unit 10A, and FIG. 16 (b) shows a waveform chart of the voltage $V_{EL}$ ($V_{EL2}$) applied to the light emitting unit 10B. The operation of the present embodiment is described below with reference to FIGS. 16 (a) and (b).

At the time t21 after activation, the constant voltage source 22 generates the first voltage V1 and supplies it to the light emitting units 10A and 10B through the diodes D4 and D5 respectively. After that, at the time t22 the constant current source 23A starts to supply the second voltage V2 to the light emitting unit 10A, and the voltage $V_{EL1}$ applied to the light emitting unit 10A is gradually increased from the first voltage V1 to the second voltage V2 throughout the predetermined time period. Further, at the time t23 the constant current source 23B starts to supply the second voltage V2 to the light emitting unit 10B, and the voltage $V_{EL}$ ($V_{EL2}$) applied to the light emitting unit 10B is gradually increased from the first voltage V1 to the second voltage V2 throughout the predetermined time period. In this regard, the constant current source 23A gradually increases the voltage $V_{EL1}$ in accordance with the change curve indicating that the temporal rate of increase in the voltage $V_{EL1}$ is decreased as the voltage $V_{EL1}$ applied to the light emitting unit 10A becomes closer to the second voltage V2. Further, the constant current source 23B gradually increases the voltage $V_{EL2}$ in accordance with the change curve indicating that the temporal rate of increase in the voltage $V_{EL2}$ is decreased as the voltage $V_{EL2}$ applied to the light emitting unit 10B becomes closer to the second voltage V2.

Thus, the constant current sources 23A and 23B gradually increase the voltages $V_{EL1}$ and $V_{EL2}$ in accordance with the change curves indicating that the temporal rates of increase in the voltages $V_{EL1}$ and $V_{EL2}$ are decreased as the voltages $V_{EL1}$ and $V_{EL2}$ applied to the light emitting units 10A and 10B get closer to the second voltage V2, respectively. Accordingly, in contrast to a case where the applied voltages $V_{EL1}$ and $V_{EL2}$ are increased from zero to the second voltage V2 instantly, a change in voltage per unit time can be decreased. Hence, it is possible to reduce a surge which occurs in the load current when the light emitting units 10A and 10B are lit up. Further, the constant current sources 23A and 23B start to operate at different timings. Hence, timings at which the applied voltages $V_{EL1}$ and $V_{EL2}$ reach the lighting start voltage Vs, that is, the timings t24 and t25 at which the light emitting units 10A and 10B are lit up can be made different from each other. Consequently, surges which would occur when the light emitting units 10A and 10B are lit up can be dispersed, and thus stress on the power supply circuit 2 can be reduced.

As mentioned above, in the light emitting element lighting device shown in FIG. 15, the single constant voltage source 22 is connected in common to the two constant current sources 23A and 23B. Alternatively, as shown in FIG. 17, the separate constant voltage sources 22 (22A and 22B) may be connected to the respective constant current sources 23 (23A and 23B).

Figure 17:
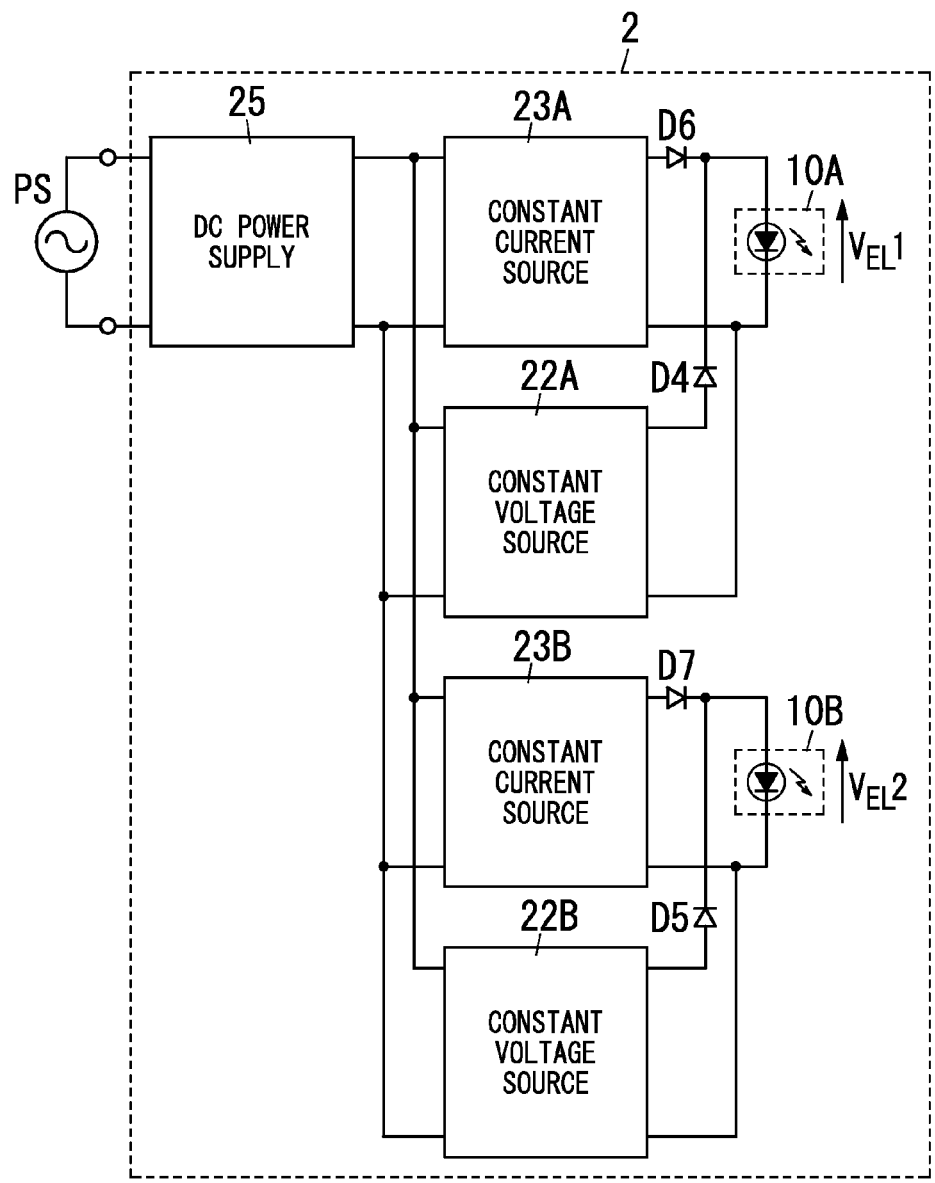
FIG. 17 is a block circuit diagram illustrating the modified circuit of the light emitting element lighting device of the fourth embodiment.

As for the lighting device shown in FIG. 17, the power supply circuit 2 includes the DC power source 25, the constant voltage sources 22A and 22B, and the constant current sources 23A and 23B. The DC power source 25 is designed to convert an AC voltage supplied from the AC power source PS into a DC voltage. Each of the constant voltage sources 22A and 22B and the constant current sources 23A and 23B receives the DC voltage from the DC power source 25 and operate with the received DC voltage.

The light emitting unit 10A is connected between the output terminals of the constant voltage source 22A via the diode D4, and the light emitting unit 10A is connected between the output terminals of the constant current source 23A via the diode D6. Further, the light emitting unit 10B is connected between the output terminals of the constant voltage source 22B via the diode D5, and the light emitting unit 10B is connected between the output terminals of the constant current source 23B via the diode D7. Each of the constant voltage sources 22A and 22B and the constant current sources 23A and 23B incorporates therein a timer (not shown) designed to count an elapsed time from the time of activation, and is designed to vary its output according to the elapsed time counted by its timer.

Figure 18:
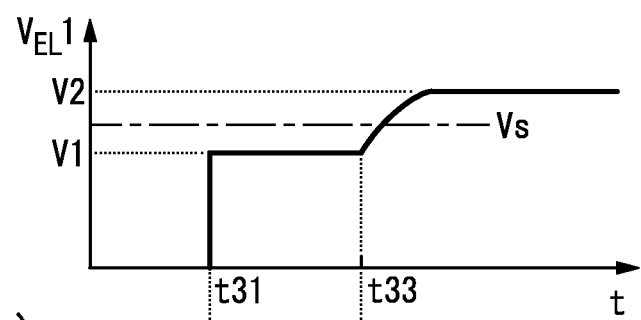
FIG. 18 is a waveform chart illustrating the voltage applied to the light emitting unit of the modified circuit of the light emitting element lighting device of the fourth embodiment.
Figure 18:
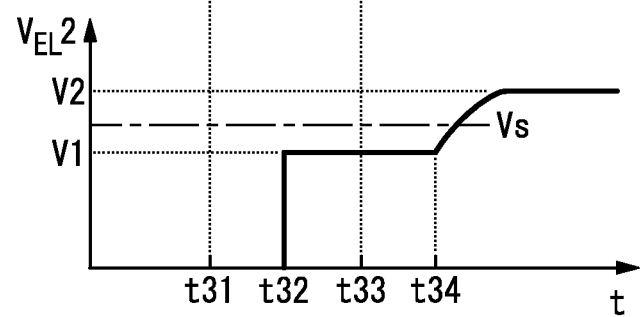

FIG. 18 (a) shows a waveform chart of the voltage $V_{EL1}$ applied to the light emitting unit 10A, and FIG. 18 (b) shows a waveform chart of the voltage $V_{EL2}$ applied to the light emitting unit 10B. The operation of the lighting device shown in FIG. 17 is described below with reference to FIGS. 18 (a) and (b).

At the time t31 after activation, the constant voltage source 22A generates the first voltage V1 and supplies it to the light emitting unit 10A through the diode D4. Further, at the time t32, the constant voltage source 22B generates the first voltage V1 and supplies it to the light emitting unit 10B through the diode D5. After that, at the time t33 the constant current source 23A starts to supply the second voltage V2 to the light emitting unit 10A, and the voltage $V_{EL1}$ applied to the light emitting unit 10A is gradually increased from the first voltage V1 to the second voltage V2 throughout the predetermined time period. Further, at the time t34 the constant current source 23B starts to supply the second voltage V2 to the light emitting unit 10B, and the voltage $V_{EL2}$ applied to the light emitting unit 10B is gradually increased from the first voltage V1 to the second voltage V2 throughout the predetermined time period. In this regard, the constant current source 23A gradually increases the voltage $V_{EL1}$ in accordance with the change curve indicating that the temporal rate of increase in the voltage $V_{EL1}$ is decreased as the voltage $V_{EL1}$ applied to the light emitting unit 10A becomes closer to the second voltage V2. Similarly, the constant current source 23B gradually increases the voltage $V_{EL2}$ in accordance with the change curve indicating that the temporal rate of increase in the voltage $V_{EL2}$ is decreased as the voltage $V_{EL2}$ applied to the light emitting unit 10B becomes closer to the second voltage V2.

Thus, the constant current sources 23A and 23B gradually increase the voltages $V_{EL1}$ and $V_{EL2}$ in accordance with the change curves indicating that the temporal rates of increase in the voltages $V_{EL1}$ and $V_{EL2}$ are decreased as the voltages $V_{EL1}$ and $V_{EL2}$ applied to the light emitting units 10A and 10B get closer to the second voltage V2, respectively. Accordingly, in contrast to a case where the applied voltages $V_{EL1}$ and $V_{EL2}$ are increased from zero to the second voltage V2 instantly, a change in voltage per unit time can be decreased. Hence, it is possible to reduce a surge which occurs in the load current when the light emitting units 10A and 10B are lit up. Further, the constant current sources 23A and 23B start to operate at different timings. Hence, the timings at which the applied voltages $V_{EL1}$ and $V_{EL2}$ reach the lighting start voltage Vs, that is, the timings at which the light emitting units 10A and 10B are lit up can be made different from each other. Consequently, surges which would occur when the light emitting units 10A and 10B are lit up can be separated, and thus stress on the power supply circuit 2 can be reduced. Furthermore, timings at which the constant voltage sources 22A and 22B start to operate are made different from each other. Hence, timings when surges caused by increases in the applied voltages $V_{EL1}$ and $V_{EL2}$ from zero to the first voltage V1 occur can be made different from each other. Therefore, stress on the power supply circuit 2 can be reduced. Moreover, as for the process of applying the first voltage V1 to the light emitting units 10A and 10B extinguished, in the waveform charts shown in FIGS. 18 (a) and (b), the constant voltage source 22A and constant voltage source 22B increase the applied voltages to the light emitting units 10A and 10B from zero to the first voltage V1 instantly, the starting period can be shortened. Note that, as shown in FIGS. 16 (a) and (b), the constant voltage source 22A and constant voltage source 22B may increase the applied voltages to the light emitting units 10A and 10B from zero to the first voltage V1 gradually. In this case, a surge which occurs due to an increase in the applied voltage can be reduced.

Note that, as for the lighting devices illustrated in FIG. 15 and FIG. 17, each of the constant voltage source (22, 22A, 22B) is constituted by a switching power supply designed to adjust an output voltage to a predetermined voltage value in a switching manner (e.g., a step-down chopper circuit). The output voltage from the constant voltage source (22, 22A, 22B) may be used as control voltages for operating other circuits such as the constant current source (23A, 23B).

The constant voltage source (22, 22A, 22B) serves as a power supply for applying the first voltage V1 to the light emitting unit (10A, 10B) extinguished. While the light emitting unit (10A, 10B) is lit up, the constant current source (23A, 23B) supplies power to the light emitting unit (10A, 10B). In brief, the constant voltage source (22, 22A, 22B) is not used for supply power to compensate for power consumed by the light emitting unit (10A, 10B). Hence, the constant voltage source (22, 22A, 22B) may have relatively low current capacities, and stability of the output voltage thereof may not be required. Therefore, the constant voltage source (22, 22A, 22B) may have simplified circuit configurations. Accordingly, the constant current source (23A, 23B) may not be constituted by a switching power supply but may be constituted by a simple constant voltage circuit employing a three-terminal regulator, a zener diode, or an operational amplifier, for example.

Moreover, after the light emitting unit (10A, 10B) is lit up, power supply to the light emitting unit (10A, 10B) is performed by the constant current source (23A, 23B). When the constant voltage source (22, 22A, 22B) terminates power supply to the light emitting unit (10A, 10B), application of an unnecessary voltage and deterioration of circuit components can be prevented. Additionally, as a method for terminating power supply from the constant voltage source (22, 22A, 22B) to the light emitting unit (10A, 10B), a method of terminating operation of the constant voltage source (22, 22A, 22B) after lighting can be used. In a case where the constant voltage source (22, 22A, 22B) is used as a control power supply for other circuits, a switching element (e.g., an field-effect transistor) may be interposed between the output terminal of the constant voltage source (22, 22A, 22B) and the light emitting unit (10A, 10B). This switching element may be turned off after lighting.

Note that, in the present embodiment, operation of each of the constant voltage sources 22, 22A, and 22B and the constant current sources 23A and 23B is controlled by its own microcomputers. Alternatively, a common microcomputer can be used to control the operation each of the constant voltage source 22 (or 22A and 22B) and the constant current sources 23A and 23B.

As described above, in the present embodiment, the power supply circuit 2 includes the constant voltage source 22 or the constant voltage sources 22A and 22B, and the constant current sources 23A and 23B. Each of the constant voltage sources 22, 22A, and 22B is designed to apply the first voltage V1 to the light emitting unit 10. Each of the constant current sources 23A and 23B is designed to perform constant current control on the light emitting unit 10 in a process of application of the second voltage V2 to the light emitting unit 10.

In other words, the light emitting element lighting device of the present embodiment also includes the eleventh feature in addition to the first feature. Additionally, the light emitting element lighting device of the present embodiment may include the second to tenth features selectively.

As mentioned above, the constant voltage source (22, 22A, 22B) and the constant current source (23A and 23B) are provided as separate parts. Therefore, the constant voltage source (22, 22A, 22B) and the constant current source (23A and 23B) can be designed individually are can operate individually. Hence, detailed control on the constant voltage source (22, 22A, 22B) and the constant current source (23A and 23B) can be achieved. Further, when the output from the constant voltage source (22, 22A, 22B) and the output from the constant current source (23A, 23B) are superimposed on each other and are applied to the light emitting unit 10, the resultant output is not interrupted due to switch from constant voltage control to constant current control. Hence, the resultant output is changed smoothly. Note that, the constant voltage source (22, 22A, 22B) only outputs the first voltage V1 lower than the lighting start voltage Vs of the light emitting unit 10 but does not supply power for compensating for power consumption by loads. Therefore, the constant voltage source (22, 22A, 22B) may be a circuit with a relatively low output current capacity, and may have a relatively simple configuration.

Fifth Embodiment

Figure 19:
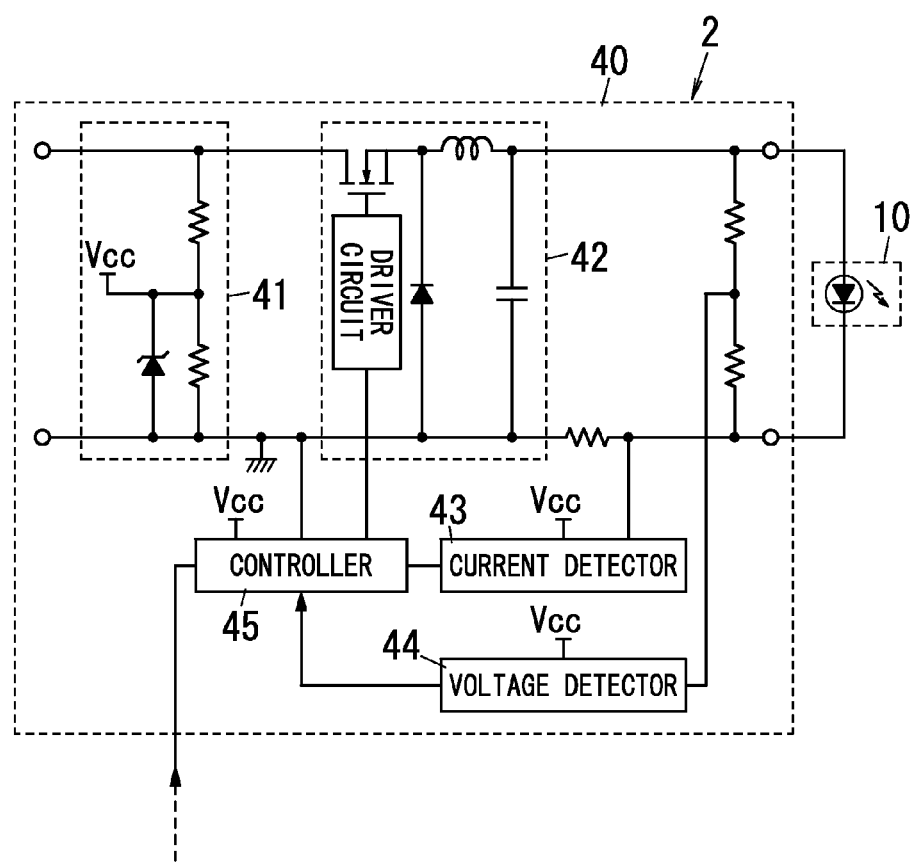
FIG. 19 is a block circuit diagram illustrating the light emitting element lighting device of the fifth embodiment.

The following explanation referring to FIG. 19 is made to the light emitting element lighting device of the fifth embodiment in accordance with the present invention.

As for the aforementioned fourth embodiment, the power supply circuit 2 is constituted by a constant voltage source and a constant current source. However, as for the present embodiment, the power supply circuit 2 is constituted by a single converter 40 designed to function as a constant voltage source as well as a constant current source.

The converter 40 includes a constant voltage circuit 41, a DC-DC converter 42, a current detector 43, a voltage detector 44, and a controller 45. The constant voltage circuit 42 is constructed by use of a zener diode. The DC-DC converter 42 is constituted by a step-down chopper circuit. The current detector 43 is designed to detect (measure) the output current. The voltage detector 44 is designed to detect (measure) the output voltage. The controller 45 is designed to control the switching operation of the step-down chopper circuit according to a detection signal fed back from the current detector 43 or the voltage detector 44, thereby controlling the output to the light emitting unit 10.

The following explanation is made to circuit operation starting when the light emitting element lighting device is turned on and ending when the light emitting unit 10 is lit up. In the period starting when the light emitting element lighting device is turned on and ending when the light emitting unit 10 is lit up, the controller 45 adjusts the voltage (supply voltage) provided to the light emitting unit 10 to the first voltage V1 according to a voltage detection signal fed back from the voltage detector 44. In this period, the converter 40 acts as a constant voltage source. After a lapse of a predetermined period from the time of application of the first voltage V1 to the light emitting unit 10, the controller 45 increases the voltage (supply voltage) to the light emitting unit 10 from the first voltage V1 to the second voltage V2 gradually. In this process, the controller 45 increases the voltage (supply voltage) applied to the light emitting unit 10 in accordance with the change curve indicating that the temporal rate of increase thereof is decreased as the voltage (supply voltage) applied to the light emitting unit 10 becomes closer to the second voltage V2. The second voltage V2 is selected to be a voltage higher than the lighting start voltage Vs. When the voltage (supply voltage) applied to the light emitting unit 10 exceeds the lighting start voltage Vs, the light emitting unit 10 is lit up. When the light emitting unit 10 is lit up, the controller 45 controls the output from the DC-DC converter 42 based on a current detection signal fed back from the current detector 43 so as to keep the output current substantially constant. After the light emitting unit 10 is lit up, the converter 40 acts as a constant current source. Accordingly, the power supply circuit 2 performs the constant voltage control in the process of applying the first voltage V1 to the light emitting unit 10, and performs the constant current control in the process of applying the second voltage V2 to the light emitting unit 10. In the present embodiment, the power supply circuit 2 performs the constant voltage control while the supply voltage is increased up to the first voltage V1, and performs the constant current control after the supply voltage is equal to the second voltage V2.

In brief, the converter 40 functions as the constant voltage source until the light emitting unit 10 is lit up, and the converter 40 functions as the constant current source after the light emitting unit 10 is lit up. Since the converter 40 performs feedback control irrespective of whether the converter 40 acts as the constant voltage source or the constant current source, a voltage or current which has a reduced variation and high precision can be supplied to the light emitting unit 10. Further, the single converter 40 operates as the constant voltage source and the constant current source. Since the constant voltage source and the constant current source are integrated, the number of parts can be decreased and the lighting device can be downsized.

As mentioned above, the power supply circuit 2 performs the constant voltage control in a process of applying the first voltage V1 to the light emitting unit 10 and performs the constant current control in a process of applying the second voltage V2 to the light emitting unit 10.

Accordingly, the light emitting element lighting device of the present embodiment includes the following twelfth feature in addition to the first feature. In the twelfth feature, the power supply circuit 2 is configured to perform the constant voltage control in the process of applying the first voltage V1 to the light emitting unit 10, and perform the constant current control in the process of applying the second voltage V2 to the light emitting unit 10. Additionally, the light emitting element lighting device of the present embodiment may include the second to tenth features selectively.

In a period of application of the first voltage V1 to the light emitting unit 10, the power supply circuit 2 performs the constant voltage control for the purpose of adjusting the applied voltage (supply voltage) to a voltage value less than the lighting start voltage Vs. While the first voltage V1 is applied, the light emitting unit 10 is not lit and no current flows through the light emitting unit 10. Therefore, the constant current control cannot be performed. With regard to an organic EL element and an LED, an input current is proportional to the light output, and a variation in the forward voltage is relatively large. Therefore, when the light emitting unit 10 is constituted by such an organic EL element or an LED, to achieve stable operation by reducing a variation in the light output, it is preferable to keep constant a current flowing through the light emitting unit 10. Hence, in a period of application of the second voltage V2, the power supply circuit 2 performs the constant current control. As mentioned above, the power supply circuit 2 performs the constant voltage control in the period of application of the first voltage V1 and the constant current control in the period of application of the second voltage V2. Consequently, stable control can be achieved, and a variation in the light output in a period of lighting can be reduced.

Besides, a timing at which the controller 45 switches the operation of the converter 40 from the constant voltage operation to the constant current operation may be equal to a timing at which the voltage (supply voltage) applied to the light emitting unit 10 reaches a voltage lower than the lighting start voltage Vs or a timing at which the voltage (supply voltage) applied to the light emitting unit 10 reaches a voltage not less than the lighting start voltage Vs. In a case where the constant voltage operation is switched to the constant current operation at the timing when the voltage (supply voltage) applied to the light emitting unit 10 reaches the voltage lower than the lighting start voltage Vs, the controller 45 performs the constant current control in a range of the voltage which allows the light emitting unit 10 to be lit up. Hence, a variation in starting characteristics (e.g., a lighting start timing and a speed of increase in the light output) can be reduced. Meanwhile, in a case where the constant voltage operation is switched to the constant current operation at the timing when the voltage (supply voltage) applied to the light emitting unit 10 reaches the voltage not less than the lighting start voltage Vs, it is possible to increase the output voltage (supply voltage) up to a higher voltage at a desired increase rate irrespective of a variation in the V-I characteristics of the light emitting unit 10. Consequently, a surge current can be more reduced.

Note that, the controller 45 may be constituted by a microcomputer or a discrete circuit.

Sixth Embodiment

Figure 20:
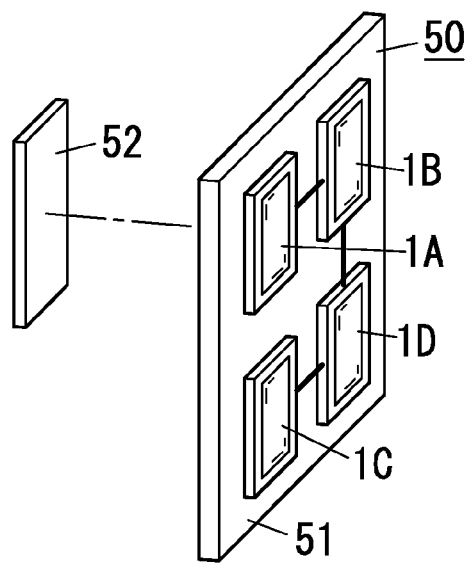
FIG. 20 is a schematic diagram illustrating the lighting fixture of the sixth embodiment.

The following explanation referring to FIG. 20 is made to the lighting fixture of the sixth embodiment in accordance with the present invention.

FIG. 20 shows an exploded perspective view illustrating the lighting fixture 50. The lighting fixture 50 includes a fixture body 51 formed into a rectangular plate shape.

Attached to one surface of the fixture body 51 are the four light emitting units 10 (10A to 10D) formed into a panel shape. The four light emitting units 10 (10A to 10D) are arranged in longitudinal and width directions at the same interval.

Each of the light emitting units 10A to 10D includes an organic EL element formed into a rectangular plate shape. Note that, each of the light emitting units 10A to 10D is constituted by an organic EL element, but may be constituted by a combination of an organic EL element and an LED.

Attached to a rear surface of the lighting fixture 51 is a power supply unit 52. The power supply unit 52 includes the power supply circuit 2 described in any one of the first to fifth embodiments and a casing designed to accommodate therein the power supply circuit 2. The power supply unit 52 is electrically connected to each of the light emitting units 10A to 10D, and power is supplied from the power supply unit 52 to the respective light emitting units 10A to 10D. The power supply unit 52 is equipped with the power supply circuit 2 (light emitting element lighting device) described in any one of the first to fifth embodiments. Hence, like the respective embodiments mentioned above, it is possible to decrease a rush current flowing into the light emitting element 1 while suppressing a distortion in a waveform of a current flowing through the light emitting element 1 as well as an increase in a loss.

In the lighting fixture 50 of the present embodiment, since the light emitting units 10A to 10D are formed into a thin flat plate shape, the lighting fixture 50 can be thinned. Therefore, the lighting fixture 50 is suitable for an interior lighting, for example. Additionally, the light emitting units 10A to 10D are individually attached to the lighting fixture 51 in a detachable manner. Further, it is possible to light up and extinguish the light emitting units 10A to 10D individually.

Besides, in each of the aforementioned embodiments, an organic EL element is used as the light emitting element 1 of the light emitting unit 10. Since the organic EL element is a planar light source, the organic EL element has a relatively great capacitance component and thus a surge current would occur when the organic EL element is lit up. However, as explained in the respective embodiments, the applied voltage equal to the first voltage V1 is applied and subsequently the applied voltage (supply voltage) is increased from the first voltage V1 to the second voltage V2 gradually. Hence, it is possible to reduce a surge current which would occur when the organic EL element is lit up.

As mentioned above, the lighting fixture of the present embodiment includes the light emitting element lighting device described in any one of the first to fifth embodiments.

In other words, the lighting fixture of the present embodiment includes: the light emitting element lighting device including the aforementioned first feature; and the fixture body 51 configured to hold the light emitting element lighting device. Additionally, in the present embodiment, the light emitting element lighting device may include the aforementioned second to twelfth features selectively.

According to the present embodiment, with being equipped with the aforementioned light emitting element lighting device, it is possible to provide the lighting fixture which can decrease a rush current flowing into the light emitting element 1 while suppressing a distortion in a waveform of a current flowing through the light emitting element 1 as well as an increase in a loss.

The invention claimed is:

1. A light emitting element lighting device comprising:
a light emitting unit including a light emitting element; and
a power supply circuit configured to supply a supply voltage to the light emitting unit,
wherein:
the power supply circuit is configured to increase the supply voltage from a first voltage lower than a lighting start voltage of the light emitting element to a second voltage higher than the lighting start voltage to light up the light emitting unit;
the power supply circuit is configured to, in a process of increasing the supply voltage from the first voltage to the second voltage, decrease a rate of increase in the supply voltage as the supply voltage gets closer to the second voltage; and
the power supply circuit is configured to increase the supply voltage from zero to the first voltage gradually.

2. The light emitting element lighting device as set forth in claim 1, wherein
the power supply circuit is configured to increase the supply voltage in accordance with a change curve defining the rate of increase in the supply voltage.

3. The light emitting element lighting device as set forth in claim 1, wherein
the power supply circuit is configured to increase the supply voltage from the first voltage to the second voltage after charging of a capacitance component of the light emitting element is completed.

4. The light emitting element lighting device as set forth in claim 1, wherein
a voltage increase rate of the supply voltage from the first voltage to the second voltage is greater than the voltage increase rate of the supply voltage from zero to the first voltage.

5. The light emitting element lighting device as set forth in claim 1, wherein
the power supply circuit is configured to decrease the first voltage when decreasing the second voltage.

6. The light emitting element lighting device as set forth in claim 1, wherein:
the light emitting unit includes the plural light emitting elements; and
the power supply circuit is configured to decrease the first voltage with a decrease in the number of light emitting elements to be lit up.

7. The light emitting element lighting device as set forth in claim 1, wherein:
the light emitting unit includes the plural light emitting elements; and
the power supply circuit is configured to, in a process of applying the first voltage to the light emitting unit, apply the first voltage to the light emitting elements at different timings with regard to at least two of the plural light emitting elements.

8. The light emitting element lighting device as set forth in claim 1, wherein:
the light emitting unit includes the plural light emitting elements; and
the power supply circuit is configured to, in a process of applying the second voltage to the light emitting unit, apply the second voltage to all the plural light emitting elements at the same timing.

9. The light emitting element lighting device as set forth in claim 1, wherein
the power supply circuit is configured to perform constant voltage control in a process of applying the first voltage to the light emitting unit and perform constant current control in a process of applying the second voltage to the light emitting unit.

10. The light emitting element lighting device as set forth in claim 1, wherein
the power supply circuit comprises:
a constant voltage source configured to apply the first voltage to the light emitting unit; and
a constant current source configured to supply a constant current to the light emitting unit to apply the second voltage to the light emitting unit.

11. The light emitting element lighting device as set forth in claim 1, wherein
the light emitting element is an organic EL element.

12. A lighting fixture comprising:
a light emitting element lighting device defined by claim 1; and
a fixture body configured to hold the light emitting element lighting device.

* * * * *